(12) United States Patent
Birnbach et al.

(10) Patent No.: US 9,406,478 B2
(45) Date of Patent: Aug. 2, 2016

(54) METHOD AND APPARATUS FOR INDUCING CHEMICAL REACTIONS BY X-RAY IRRADIATION

(75) Inventors: Curtis A. Birnbach, New Rochelle, NY (US); William H. Joyce, Newtown, CT (US); Mark L. Manewitz, New York, NY (US)

(73) Assignee: Advanced Fusion Systems LLC, Newtown, CT (US)

( * ) Notice: Subject to any disclaimer, the term of this patent is extended or adjusted under 35 U.S.C. 154(b) by 304 days.

(21) Appl. No.: 13/175,707

(22) Filed: Jul. 1, 2011

(65) Prior Publication Data

US 2012/0152722 A1 Jun. 21, 2012

Related U.S. Application Data

(60) Provisional application No. 61/360,789, filed on Jul. 1, 2010.

(51) Int. Cl.
*B01J 19/12* (2006.01)
*H01J 35/06* (2006.01)
(Continued)

(52) U.S. Cl.
CPC .......... *H01J 35/06* (2013.01); *B01J 4/004* (2013.01); *B01J 19/085* (2013.01); *B01J 19/125* (2013.01);
(Continued)

(58) Field of Classification Search
CPC ......... H01J 35/06; H01J 35/16; H01J 35/045; H01J 35/08; H01J 35/18; H01J 2235/166; H01J 2235/087; H01J 2235/186; H01J 35/14; H01J 2235/163; C01D 3/04; B01J 4/004; B01J 19/085; B01J 19/125; B01J 2219/00198; B01J 2219/00231; B01J 2219/00164; B01J 2219/00211; C01B 17/745
USPC ..................... 204/157.44; 422/186
See application file for complete search history.

(56) References Cited

U.S. PATENT DOCUMENTS 2,064,260 A * 12/1936 Herrmann ................ 204/157.44
2,980,202 A * 4/1961 Meyer .......................... 422/186
(Continued)

FOREIGN PATENT DOCUMENTS

EP 0313989 A1 5/1989
GB 888082 A 1/1962
(Continued)

OTHER PUBLICATIONS
Terrence Jensen and Joseph Gray, "The X-ray, K-edge Heavy Metal Detector," Final Report for Project CH-15C251, Aug. 2000, Ames Laboratory and Center for NDE, Iowa State University.

*Primary Examiner* — Keith Hendricks
*Assistant Examiner* — Colleen M Raphael
(74) *Attorney, Agent, or Firm* — Bruzga & Associates; Charles E. Bruzga; Jay S. Pattumudi

(57) ABSTRACT

A method for inducing chemical reactions using X-ray radiation comprises generating an irradiation volume within the interior of a reaction vessel by introducing X-ray radiation into the volume, in which two or more reactants are introduced. With respect to the two or more reactants and any subsequently created intermediate reactant or reactants, the aggregate extent to which the foregoing reactants are to be ionized to any degree is selectively controlled, and the average degree of ionization in the irradiation volume, from partial to total, of that portion of the foregoing reactants which is to be ionized is selectively controlled, through control of the fluence and energy of the X-ray radiation, to thereby induce selective reactions of reactants to occur in the irradiation volume. One or more reactants may be delivered through a double-walled pipe containing X-ray shielding to prevent their premature irradiation before being injected into the irradiation volume.

35 Claims, 13 Drawing Sheets

(51) Int. Cl.
  *B01J 4/00*    (2006.01)
  *B01J 19/08*   (2006.01)
  *C01B 17/74*   (2006.01)
  *C01D 3/04*    (2006.01)
  *H01J 35/04*   (2006.01)
  *H01J 35/08*   (2006.01)
  *H01J 35/16*   (2006.01)
  *H01J 35/18*   (2006.01)
  *H01J 35/14*   (2006.01)

(52) U.S. Cl.
  CPC ............... *C01B 17/745* (2013.01); *C01D 3/04* (2013.01); *H01J 35/045* (2013.01); *H01J 35/08* (2013.01); *H01J 35/16* (2013.01); *H01J 35/18* (2013.01); *B01J 2219/00164* (2013.01); *B01J 2219/00198* (2013.01); *B01J 2219/00211* (2013.01); *B01J 2219/00231* (2013.01); *H01J 35/14* (2013.01); *H01J 2235/087* (2013.01); *H01J 2235/163* (2013.01); *H01J 2235/166* (2013.01); *H01J 2235/186* (2013.01)

(56) References Cited

U.S. PATENT DOCUMENTS

| | | | |
|---|---|---|---|
| 3,067,115 A * | 12/1962 | Clingman, Jr. | 204/157.63 |
| 3,231,483 A | 1/1966 | Cotton | |
| 3,287,088 A * | 11/1966 | Seevers | 204/157.63 |
| 3,342,899 A | 9/1967 | Doumas | 522/124 |
| 3,378,475 A * | 4/1968 | Morse | 204/157.44 |
| 3,459,232 A * | 8/1969 | Malcolm | 138/103 |
| 3,462,354 A * | 8/1969 | Boris | 204/157.63 |
| 3,714,486 A * | 1/1973 | McCrary | 378/122 |
| 3,786,250 A * | 1/1974 | Huhn | B01J 19/122 422/186 |
| 3,827,982 A * | 8/1974 | Hall | 250/517.1 |
| 3,895,143 A * | 7/1975 | Tarlow | 376/286 |
| 4,116,784 A | 9/1978 | Hosoi et al. | |
| 4,224,425 A | 9/1980 | Buergle et al. | |
| 4,247,379 A | 1/1981 | Leach | |
| 4,261,805 A * | 4/1981 | Galliker et al. | 204/157.44 |
| 4,472,228 A | 9/1984 | Yoshimura et al. | |
| 4,827,371 A * | 5/1989 | Yost | 361/213 |
| 4,947,415 A * | 8/1990 | Collins | 378/122 |
| 5,516,845 A | 5/1996 | Heese et al. | |
| 6,179,968 B1 * | 1/2001 | Izutsu et al. | 204/157.44 |
| 6,825,244 B2 | 11/2004 | Lambert et al. | |
| 6,916,598 B2 | 7/2005 | Wang | |
| 7,085,351 B2 * | 8/2006 | Lu et al. | 378/122 |
| 7,274,772 B2 * | 9/2007 | Lesiak et al. | 378/136 |
| 7,345,537 B2 | 3/2008 | Apel et al. | |
| 7,709,098 B2 | 5/2010 | Yoda et al. | |
| 2004/0245085 A1 | 12/2004 | Srinivasan | |
| 2005/0002835 A1 | 1/2005 | Shaw et al. | |
| 2005/0077170 A1 | 4/2005 | Bingham et al. | |
| 2006/0108537 A1 * | 5/2006 | Okuyama et al. | 250/423 P |
| 2007/0224401 A1 * | 9/2007 | Telander | 428/212 |
| 2007/0237296 A1 | 10/2007 | Wyatt et al. | |
| 2008/0196829 A1 | 8/2008 | Galloway et al. | |
| 2009/0095917 A1 | 4/2009 | Doring et al. | |
| 2009/0285362 A1 | 11/2009 | Birnbach | |
| 2010/0000853 A1 * | 1/2010 | Medoff | 204/157.63 |
| 2011/0180385 A1 | 7/2011 | Imholt | |

FOREIGN PATENT DOCUMENTS

| | | |
|---|---|---|
| GB | 1049325 A | 11/1966 |
| JP | 62197452 | 9/1987 |
| JP | 8169093 | 7/1996 |
| JP | 2000-515808 A | 11/2000 |
| JP | 2004161552 A | 6/2004 |
| JP | 2005-507309 A | 3/2005 |
| JP | 2007029819 A | 2/2007 |
| WO | 9804336 A1 | 2/1998 |
| WO | 02/072251 A1 | 9/2002 |

\* cited by examiner

METHOD AND APPARATUS FOR INDUCING CHEMICAL REACTIONS BY X-RAY IRRADIATION

CROSS-REFERENCE TO RELATED APPLICATIONS

This application claims priority from U.S. Provisional Application No. 61/360,789, filed on Jul. 1, 2010, the disclosure of which is incorporated herein by reference in its entirety.

FIELD OF THE INVENTION

The invention relates to a method of inducing chemical reactions utilizing intense X-radiation to break the existing molecular bonds of a plurality of chemical reactants and controlling the recombination or recombinations of the resulting ions.

BACKGROUND OF THE INVENTION

It is widely recognized that many methods of inducing chemical reactions are energy "inefficient" or in some cases are incapable of creating a desired chemical compound. Typical chemical processes create reactive states by use of various combinations of positive pressure (positive or negative), temperature, and motion. The purpose of this is to selectively break molecular bonds and allow chemicals to recombine into different, preferential molecular structures. These techniques are predominantly the use of one or more of:
1. Controlled thermal conditions; that is, heating, cooling, or both,
2. Controlled pressure above or below ambient atmospheric pressure,
3. Controlled atmospheres, and
4. Catalysis.

However, in many cases, these process conditions have undesirable consequences. These processes can also be energy inefficient.

Accordingly, it would be desirable to be able to eliminate or reduce the amount of either or both of the pressure and temperature components of chemical processing regimes as a means of reducing capital cost and increasing efficiency of inducing chemical reactions.

BRIEF SUMMARY OF THE INVENTION

In one preferred example, a method for inducing chemical reactions using, X-ray radiation comprises generating an irradiation volume within the interior of a reaction vessel by introducing X-ray radiation into the volume. Two or more reactants are introduced into the irradiation volume. With respect to the two or more reactants and any subsequently created intermediate reactant or reactants, the aggregate extent to which the foregoing reactants are to be ionized to any degree is selectively controlled, and the average degree of ionization in the irradiation volume, from partial to total, of that portion of the foregoing reactants which is to be ionized is selectively controlled, through control of the fluence and energy of the X-ray radiation, to thereby induce selective reactions of reactants to occur in the irradiation volume.

Beneficially, the foregoing method eliminates or reduces the amount of either or both of the pressure and temperature components of chemical processing regimes so as to reduce capital cost and increase efficiency of inducing chemical reactions.

In a preferred example of another aspect of the invention, an X-ray shielded pipe assembly can be used for introducing one or more reactants into a reaction processing vessel having a main volume. The pipe assembly includes a main X-ray shielded path and a plurality of X-ray shielded injector paths extending outwardly from the main shielded path. The main shielded path includes an inner pipe surrounded by an outer pipe; and an intermediate shield material contained in a volume between the inner pipe and the outer pipe, for shielding the one or more other reactants against X-radiation prior to a step of X-ray irradiation of contents of the main volume, wherein a feedstock reactant reacts with the one or more other reactants in the main volume. Each shielded injector path comprises an injector aperture insert having an aperture for delivery of the one or more other reactants into the main volume and being sealingly connected between the inner and the outer pipes, which are respectively provided with openings that allow some of the one or more other reactants to flow from the inner pipe through the injector pipe and into the main volume.

Beneficially, the foregoing X-ray shielded pipe assembly prevents premature irradiation of reactant, prior to being injected into the main volume

BRIEF DESCRIPTION OF THE DRAWINGS

Further features and advantages of the invention will become apparent from reading the following detailed description in conjunction with the following drawings, In in which like reference numbers refer to like parts.

DETAILED DESCRIPTION OF THE INVENTION

Disclosed herein is a general method of inducing chemical reactions using an intense, pulsed X-ray source such as the X-ray source used in the Flash X-ray Irradiator (hereinafter, "FXI") disclosed in Patent Publication No. US 2009/0285362 A1, dated Nov. 19, 2009 and in WO 2009/140697 A1, dated Nov. 19, 2009 (hereinafter, "FXI patent publication"). The FXI patent publication is incorporated herein in its entirety by reference. In the context of generating X-rays, the word "pulse" connotes an event of predetermined time duration, typically less than one second. In one example, involving total ionization of reactants, the pulsed X-ray source creates a reactive environment by dissociating all molecular bonds in an influent stream of material to be reacted using high energy X-rays up to 1.2 MeV in energy. This causes the material to become highly ionized. Through the introduction of reactant chemicals into the reactive environment, desirable reactions are selectively caused with the ionized material. Ionization of the material to be reacted using high energy X-rays can involve total or partial ionization of the material.

The term "ionize" as used throughout the specification includes "total" ionization as well as "partial" ionization. The term "total" ionization connotes the removal of all electrons from an atom or molecule, whereas the term "partial" ionization refers to removal of fewer than all electrons from an atom or molecule.

The reactant chemicals can either be added prior to entering the irradiation volume, or can be introduced within the irradiation volume itself. One use for the claimed method is to solve the problem of metals in industrial waste discharges by converting them to innocuous compounds. As an example, a feedstock containing hexavalent chromium can be reacted with oxygen to form chromium dioxide, which is inert and would precipitate out from the solution.

Figure 1:
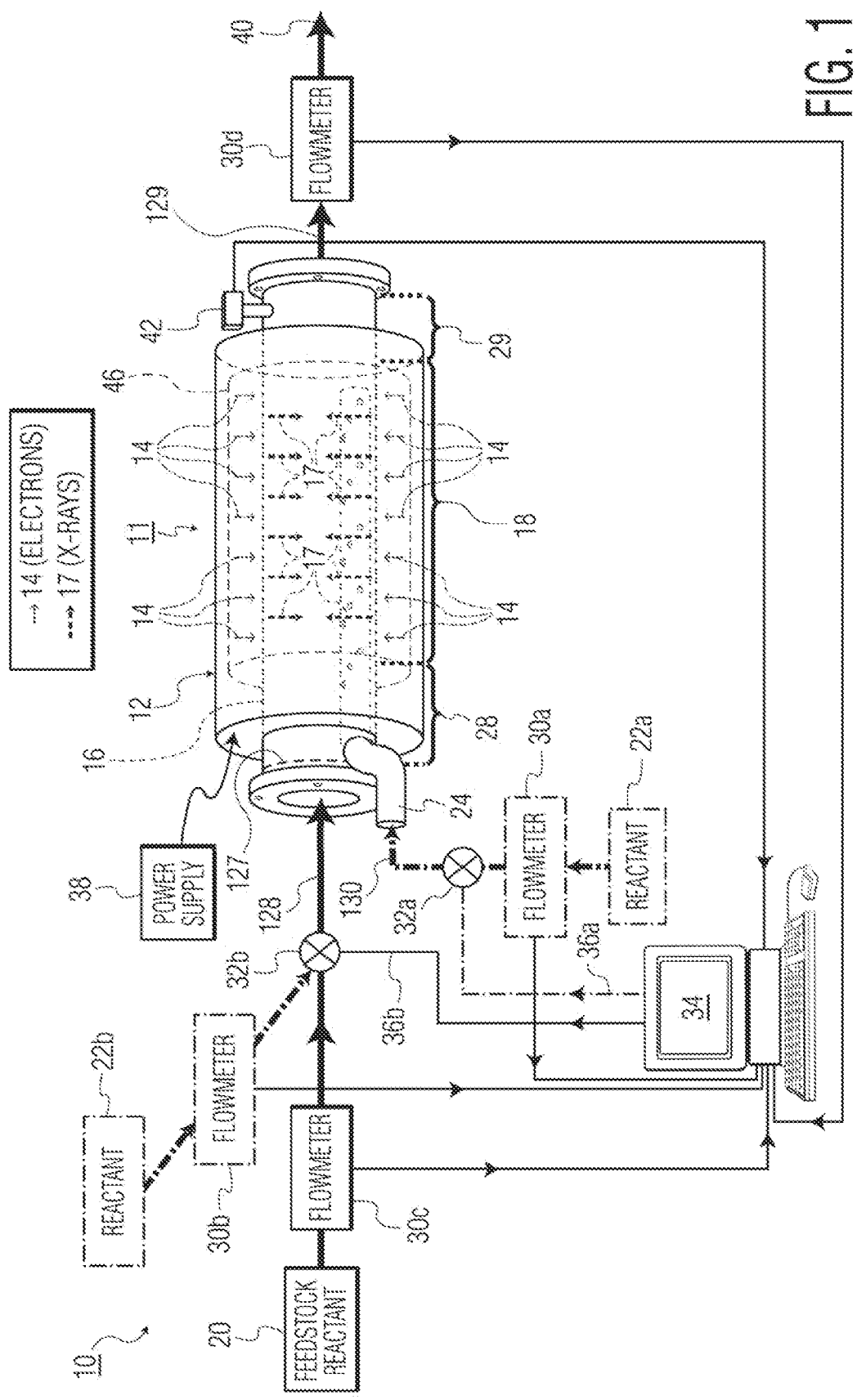
FIG. 1 is a simplified diagrammatic view, partially in block form, of a system for practicing an example of the claimed method in a continuous processing mode, with electrical feedthroughs omitted for clarity, and with optional features shown with phantom lines.

RCP 11 in FIG. 1 includes means for adding chemicals into an irradiation volume 18 such as injector pipe assemblies 24 so as to react the materials present in that region of the device. These chemicals can be gaseous, liquid, plasma, or solid in form when introduced into the reaction area. Attention needs to be directed to solubility of these compounds, as will be routine to a person of ordinary skill in chemistry.

RCP 11 requires a high voltage power supply 38 that can handle capacitor charging to supply the cathode 46, which is a massive current sink, and that provides a charging current at a level sufficient to achieve the desired repetition rate of the RCP 11. Therefore, such a power supply 38 must have a large, low-inductance capacitor energy storage means, and a pulse forming means, and must be able to produce a required operating voltage, which can range up to approximately 1.22 million volts. Suitable power supplies will be apparent to those of ordinary skill in the art, from such publications as the FXI publication. The term "approximately" as used in the specification takes into account minor experimental deviations as will be understood by a person of ordinary skill in the art.

A further objective of the claimed method extends beyond the type of remediation applications contemplated by the above-cited FXI publication, and into the realm of primary chemical manufacturing. Thus, the claimed method can be used for manufacturing various chemical compounds. Beneficially, the use of X-radiation to create a reactive state is more energy efficient in many processes than existing processes.

X-rays at 1.22 MeV energy are at a preferred maximum value, where 1.22 MeV is approximately 1.22 million electron volts. The term "approximately" takes into account minor experimental deviations as will be understood by a person of ordinary skill in the art. If energy substantially above that value is used, specifically above 1.22 MeV, it is likely that the material being irradiated will become permanently radioactive. This is undesirable in most cases unless one is specifically trying to create radioactive materials. Lesser values can be successfully used. The 1.22 MeV value is substantially higher than the maximum bonding energy, which is 115.6 KeV in the case of Uranium, the naturally occurring element with the highest atomic weight.

In one example, the claimed method can also be used to combine or transmute transuranic elements by using X-rays with an energy substantially in excess of 1.22 MeV.

With reference to FIG. 1, a system 10 can be used to carry out an exemplary method by inducing chemical reactions using X-ray radiation. System 10 includes a Reaction-Inducing Chemical Processor (RCP) 11 with an X-ray generator 12. X-ray generator 12 generates electrons 14 that pass through a wall section of an inner pipe 16, generating intense X-rays 17 that form an irradiation volume 18 that is located within pipe 16. The inner pipe 16 is sometimes referred to hereinafter as a "reaction vessel". In the illustrated embodiment, both the X-ray generator 12 and the X-rays 17 subsequently generated by interaction between the electrons and the wall of pipe 16 encircle the irradiation volume 18 within pipe 16.

System 10 introduces two or more reactants into the irradiation volume 18, including a feedstock reactant 20 and one or more other reactants, which are numbered 22a and 22b (shown as dashed boxes), although the number of other reactants is not limited to two. In one example involving total ionization of reactants, system 10 uses the mentioned X-rays 17 to ionize all reactants and any subsequently created intermediate reactant or reactants in the irradiation volume 18, to thereby induce selective reactions to occur.

Preferably, system 10 and other systems employing the claimed invention possess the ability to selectively control the degree of ionization within the irradiation volume 18, from partial to total, of the feedstock reactant 20, other reactant or reactants such as 22a and 22b, and any subsequently created intermediate reactant or reactants, through control of the fluence and energy of X-ray rays 17, to thereby induce selective reactions to occur in the irradiation volume. Size considerations for the RCP 11 are described below.

As used herein, all chemicals including a feedstock are referred to as "reactants." A "feedstock" is the predominant or starting chemical, or reactant, being fed into an irradiation volume as is commonly understood by persons of ordinary skill in the art. The terms "feedstock" and "feedstock reactant" are interchangeable terms and are synonymous. The term "reactant" also connotes the inclusion of non-reactive solvents, diluents, or carriers, etc., as is customary in the art. One or more catalysts 127 (FIG. 1) may be preferentially involved in promoting such reactions.

Radiation shielding of the external surfaces of RCP 11 has been omitted for clarity in FIG. 1. The need for such shielding will be apparent to one of ordinary skill in the art, and is described in more detail below. The only radiation-shielded component shown in FIG. 1 is a shielded injector pipe assembly 24, which is described in detail below.

Concurrent Irradiation and Mixing of Reactants

In order to allow for concurrent irradiation and mixing, system 10 of FIG. 1 incorporates the hardware necessary for performing the injection and mixing operations.

In FIG. 1, at least one radiation-shielded injection pipe assembly 24 is shown, with a small diameter relative to the inside diameter of the RCP 11. The pipe assembly 24 is installed preferably using a continuous welding process where the radiation shielded injector pipe assembly passes through a side wall of the interior pipe 16 in the region of the inlet section 28. The pipe assembly 24 is then subsequently attached onto an inside wall of the RCP 11 preferably using spot-welding; however, alternatives to spot-welding will be apparent to those of ordinary skill in the art. This injection pipe assembly 24 is perforated and contains a plurality of apertures along its length.

The purpose of the apertures in the injection pipe assembly 24 is to effect injection of a reactant material into the feedstock stream flowing through the cylindrical RCP 11. There is an end cap 66b (FIG. 2) which is shielded to close off the end of the injector pipe to force the injected reactants into a preferred distribution across the irradiation volume 18 for injection into said reaction. The one or more radiation shielded injector pipe assemblies 24 are brought through the wall of the inlet section 28 immediately prior to the irradiation volume 18. If there are more than one radiation-shielded injector pipe assemblies 24, they may be connected together outside the system by a manifold (not shown).

The radiation-shielded injector pipe assembly 24 can be fed with reactants from one end as shown in FIG. 1, in which case the injection pipes of assembly 24 enter the RCP 11 on the left-shown upstream side; or, the injector pipes of assembly 24 can be fed from both ends (not shown) to effect a higher injection rate than is possible in a single-end fed system due to static pressure losses within the injection pipes. If the injector pipes of assembly 24 are fed from both ends, it is necessary to monitor flow of reactant 22a through all inlets to the pipes of assembly 24, preferably by a flowmeter 30a, to assure accurate measurement of the reactants 22a being injected into the irradiation volume 18.

The apertures of injector pipe assembly 24 are preferably oriented so as to produce the maximum amount of turbulent mixing in the irradiation volume 18. There are many allowable orientations for these apertures. The choice of orientation is determined by the specific reactant being injected and the specific feedstock 20 being injected into. It is desirable to have the injector pipe assembly 24 physically located so that the injection process starts upstream of the irradiation volume 18 in order to provide the correct mixture of chemicals at the onset of irradiation. The distribution of injection apertures can be tailored to have a higher rate of injection towards the input side of the irradiation volume 18 and a diminishing number of apertures further down the volume.

Pre-Mixing of Reactants Prior to Irradiation

Pre-mixing of reactants 20 and 22b, at a time prior to introduction into the irradiation volume 18, is appropriate when these reactants do not normally mutually react, unless they are ionized as would occur in irradiation volume 18, or are subjected to any or all of non-standard temperature, pressure, and catalytic conditions. This approach allows a simpler and lower-cost RCP 11 as a result of eliminating radiation-shielded pipe assembly 24.

In cases where it is desirable to mix the reactants 20 and 22b, a mixing valve 32b is used to combine the reactants at an appropriate ratio, as will readily be apparent to a person of ordinary skill. The instantaneous ratio is determined by use of data from flowmeters 30b and 30c, which is fed to host computer 34 where it is compared to desired process conditions programmed by the system operator. Host computer 34 performs a calculation on this data, which is then used to generate an output signal on control line 36b to control mixing valve 32b.

Any given molecule of the individual reactants 20, 22a or 22b, or their combined product which forms the output flow 40, will be irradiated more than once during the passage through the RCP 11. With reference to the combined product which forms the output flow 40, it is not deleterious to the chemistry of the combined product that it can be irradiated more than once or over an extended period of time.

A person of ordinary skill in the art will readily appreciate that both concurrent mixing and pre-mixing can advantageously used with the RCP 11 when circumstances require.

Feedback-Based Control System

As is the case with most chemical process reactions, it is essential that the proper ratio between the feedstock reactant 20 and other reactant(s) 22a and 22b be maintained. If a dynamic means of controlling the mixture ratio is desired, it is preferable to include a feedback-based control system that provides at least two functions:
1. Measurement of exact amount of feedstock and reactant(s), and
2. Means of controlling the mixture ratio between the feedstock and the reactant(s).

A further level of control over the process can be realized by measurement of the process output chemistry. This step assures that the output flow 40, shown in FIG. 1, has the desired chemistry and does not have any undesirable compounds present In order to assure measurement of the exact amount of feedstock reactant 20 and any other reactant(s) 22a and 22b, instrumentation techniques such as the use of mass flow meters, which are the most accurate, and conventional flowmeters such as those shown in FIG. 1 as flowmeters 30a-30d, are used. The outputs of these flowmeters 30a-30d as indicated by arrows are fed to the host computer 34, which analyzes the data and determines if the mixture ratio is correct. If not, the host computer generates output signals on control lines 36a and 36b that may be proportional to the degree of ratio imbalance, and which control mixing valves 32a and 32b to achieve the correct mixture ratio.

There is a flowmeter 30a for reactant 22a, a flowmeter 30b for reactant 22b, a flowmeter 30c for feedstock reactant 20, and a flowmeter 30d that measures the output flow 40. Each of the flowmeters includes an associated valve such as 32a and 32b, shown in FIG. 1, for example. However, flowmeter 30d as shown in FIG. 1, which measures the output flow, need not include a valve.

The flowmeters 30a-30d are capable of providing dynamic data to allow for adjustment of the process in real time, to meet the requirements of dynamically changing flow rates of the reactants 20, 22a and 22b.

Some reactions have the potential to produce undesirable byproducts if the foregoing mixture ratio is not correct. Since these byproducts can be toxic, explosive, or dangerous in other ways, a preferred embodiment of the claimed method includes a means for measurement of the output to determine if any undesirable byproducts have been formed. The preferred means of performing this measurement is by use of a chemical sensor 42, such as spectroscope or chromatograph.

Many forms of spectrographic or chromatographic instruments can be used with the claimed method. The preferred technique is the use of a mass spectroscope to generate a full chemical analysis which includes display of the amount of undesirable byproduct(s) present. This chemical analysis data is used by the host computer 34 in addition to the data from flowmeters 30a-30d as described above, to more precisely adjust the balance of the ratio of the feedstock reactant 20 to the other reactant(s) 22a and 22b. As will be routine to those of ordinary skill in the art, other real-time techniques, or variations in the feedback system, for determining the chemistry of the output flow 40 can be used.

The benefits of the foregoing version of the feedback-based control system, including chemical sensor 42, include a redundant capability for controlling the reaction. This approach damps the correction signals found on control lines 36a and 36b to minimize any possible overswing in the mixture ratio, thus assuring a consistent and continuous chemistry of the output flow 40. Additionally, the control system must prevent control-loop-generated overswings in control signals on control lines 36a and 36b to avoid potentially catastrophic release of unwanted byproducts.

Basic Physics of the Claimed Method

With reference to FIG. 1, the basic process of the Reactive Chemical Processor (RCP) 11 comprises total or partial ionization of all or part of the feedstock reactant 20, and all other reactants 22a and 22b, followed by recombination of the resulting mix of atomic species into their lowest energy states. The resulting mix of atomic species produces an output flow 40. With reference to FIG. 1, in the RCP 11, the reactive chemical process includes total or partial ionization of all or part of the feedstock reactant 20 and the other reactant chemicals 22a and 22b, for instance.

When exposed to the radiation, if "total" ionization occurs, all the molecular bonds of the reactant chemicals are broken, and all the constituent atoms totally ionized, due to the energy of the photons preferably being substantially higher than the energy of the molecular bonds on any element on the periodic table. In this example, free atoms are totally or partially ionized by this irradiation process. The element with the highest naturally occurring atomic number, is Uranium, with a maximum bonding energy of 115.6 KeV. By using X-rays with energies up to one million electron volts (MeV), any collision will break any bond, reducing the energy of the X-ray photon by an amount corresponding to the energy required to break a bond. As the energy of the resulting X-ray photon is substantially higher than the energy of any atomic or molecular bonds of naturally occurring elements, there will still be a substantial amount of energy available for secondary bond-breaking activities. The RCP 11 (FIG. 1) is capable of producing X-ray beams of hundreds of thousands of amperes fluence, thus ensuring a plentiful amount of photons for bond-breaking activity. This extraordinary beam current is due to the specific cathode used in the claimed method, as disclosed in U.S. Pat. No. 4,670,894 by the present inventor. Once in an ionized state, the elemental constituents will recombine into the lowest energy-state molecules, as determined by the mixture of elements present at the moment. Since there are approximately $6.24 \times 10^{18}$ electrons in an ampere, a single pulse from the RCP 11 could introduce in excess of $10^{23}$ X-ray photons into the irradiation volume in a highly uniform and dispersed fashion.

When electrons strike the anode, they create a region of Bremsstrahlung X-radiation. Bremsstrahlung is German for "braking radiation" and is created when electrons with a potential in excess of approximately 23 KiloVolts are suddenly stopped or decelerated, in this case by striking the anode. There are also a large number of secondary electrons present in the irradiation volume. The inner hollow volume of the anode of the RCP 11, referred to herein as the "irradiation volume 18," contains the reactants to be reacted.

The Bremsstrahlung photons strike atoms of material in the inner volume of the anode, or irradiation volume, and, as a result of their being at significantly higher energy than the K-shell ionization potential of the atom, they ionize all atoms present. In some cases, total ionization is accomplished. In other cases, where it is so desired, "partial" ionization can be controllably induced. Not only does the first strike of an atom by an X-ray photon cause ionization, but consequently released photons colliding with not-yet-ionized atoms also cause ionization so long as their energy level is sufficient. The resulting electron repopulation cascade causes the release of photons as each electron shell of the atom is filled. The surplus of electrons ensures that this process occurs very rapidly. As the photon's energy is substantially higher than the K-shell binding energy, the foregoing process is, repeated.

The X-ray photon gives off a precise amount of energy, which allows determination of the number of possible ionization events due to a single Bremsstrahlung X-ray photon. There can be many ionization events, until eventually the photon's energy is too low to effect total ionization, where "partial" ionization can suffice in certain chemical reactions. Another possible sequence of events is that the photon collides with the inner surface of the anode wall. If the X-ray photon has sufficient energy, this collision will also result in the release of Bremsstrahlung and secondary electrons. If either the Bremsstrahlung or secondary electron is of higher energy, than the K-shell binding energy of the atom in the irradiation volume with which they collide, total ionization will occur.

These processes can continue until the Bremsstrahlung photon energy drops to a value below which it can no longer ionize atoms in the anode inner volume. The photon energy can drop to as low as 1.8 eV and still be effective if the atom it collides with is hydrogen.

Partial Ionization

In some circumstances, it is not desirable to totally ionize the feedstock reactants and other reactants and partial ionization can be employed to elicit certain specific reactions using the aforementioned method. Partial ionization by selective application of X-radiation of a known fluence and energy can be used, by application of the teachings of this method, to either lower or raise the molecular weights, and controllably adjust the lengths, of the molecular chains, by the appropriate choice of X-ray beam fluence and energy, coupled with considerations for irradiation volume and throughput as will be apparent to the person of ordinary skill in these arts.

Depending on the requirements of the desired process, a person of ordinary skill can selectively induce either "partial" or "total" ionization of the feedstock reactants and one or more other reactants. In some chemical reactions, it can be appropriate to only allow for "partial" ionization. In other reactions, "total" ionization may be required.

The claimed method also allows for partial polymerization of the reactants. This can be desirable to enable control over the degree of polymerization by initiating polymerization by using the claimed method and then terminating polymerization by selectively controlling the voltage, current, and waveform pulse characteristics to achieve the desired x-ray energy spectral and flux. Thus, the claimed method allows for a greater degree of control in the process of partial polymerization than previously known methods.

Partial polymerization can be particularly desired in applications where greater viscosity is desired, such as with coating agents. In one example, reactive monomers can combine to form a resulting end product, in which a portion of the end product is polymerized, while other portions remain unpolymerized.

Reduction of Molecular Weight

The claimed method provides a means to reduce the molecular weight of polymers by irradiation, principally with X-rays from the pulsed X-ray source. Examples of this include the use of the claimed method to treat the hydrocarbon molecules present in tar sands so as to reduce their molecular weight via chain scission. The decline in molecular weight, and therefore molecular chain length, reduces viscosity and enables vast improvements in ease of separations. The claimed method can be preferably used to, either or both, inject reactants, or place catalysts in the irradiation volume 18, that will determine the scission point of a molecular chain or impart other desirable characteristics to the end product. It is not necessary to uniformly reduce molecular weight since low molecular weight fractions tend to plasticize and the remaining high molecular weight fractions rigidize the polymer. The foregoing combination of properties that arise as a result of the distribution of molecular weights is favorable and improves the quality of the resulting end product.

Selective X-ray irradiation uses the random nature of a chain scission reaction in order to produce a broad range of molecular weights from a group of polymers consisting of similar-sized molecular chains. This broadening of the range of molecular weight increases the ease of processing such polymers into finished products while maintaining most of their desirable physical properties. An example of the value of using the claimed method's ability to reduce molecular weight is in expanding the range of useful catalysts used to produce polymers. Many catalysts that are desirable for their speed of polymerization and high efficiency are not useful because they cannot be controlled and produce polymers which are too high in molecular weight in order to be useful. A subsequent treatment by irradiation with the claimed method or another irradiation source of comparable fluence and energy can reduce the molecular weight to the desired level.

The method can be used to partially ionize the reactants, either to ultimately reduce the molecular weight of the reactants or to controllably increase the molecular length/weight of the reactants. In one example, two reactants can be partially ionized such that they recombine to form a resulting end product with a lower molecular weight than the combined molecular weight of the reactants. Alternatively, two reactants are partially ionized such that they recombine to form a resulting end product with a controllably higher molecular length/weight than either one of the reactants or a combination of the reactants. In this connection, the reactants again refer to a feedstock reactant and one or more other reactants.

The claimed method can be advantageously used to selectively reduce the molecular weight of one or more chemical substances, either temporarily, as an intermediate step, or permanently.

For example, petroleum can have a high molecular density. It is common practice to continuously heat petroleum in order to lower its viscosity, which is an expensive and inefficient means of reducing the viscosity of such products. Once the continuous heating is stopped, the petroleum becomes highly viscous. By contrast, the claimed method can selectively reduce the molecular weight (and viscosity) of a petroleum substance, such that the petroleum substance is permanently changed to one of a selectably lower molecular weight.

Where total ionization is not required, the X-ray irradiation beam energy can be reduced in energy and fluency to allow partial ionization with the intent of achieving specific, selected partially-ionized states. For achieving such partial ionization states, in one example, it may be necessary to reduce the diameter of the irradiation volume 18 so that substantially all of feedstock reactant and other reactants are ionized to the desired state. In this circumstance, it may be desirable to increase the length of the irradiation volume 18.

With regard to the foregoing discussion on reduction of diameter of the irradiation volume 18, it should be realized that, in the case of a totally ionized irradiation volume 18, the energy of the X-ray irradiation (in electron volts [eV]) is governed by the volume and average atomic number of the feedstock reactant and other reactants. If this energy is not high enough, the X-rays will not have sufficient power to propagate to, and pass, the axial center of the irradiation volume 18.

Recognizing this problem of delivering exact amounts of power to specific areas within the irradiation volume, and, in cases where only a fraction of the reactant(s) is desired to be, ionized, it then becomes necessary to adjust the diameter of the irradiation volume 18 to assure that sufficient energy reaches the axial center but does not reach too high of a value such that ionization beyond the desired level occurs. Such values can be readily realized by a person of ordinary skill in the art.

Similarly, where ionization of all the reactants is desired, if the energy of the X-ray photons is too low, the X-rays will not propagate to the axial center of the irradiation volume 18, and some portion of the feedstock reactant and other reactants will not be ionized sufficiently to achieve the desired reaction. The present specification teaches how to control the reaction to a point where desired selected molecular states can be reliability achieved at higher efficiencies and with lower environmental burdens than with prior art technologies.

Polymers such as low density polyethylene (LDPE) have repeated chains or structures of the same monomer unit, while other polymers have mixed chains of more than one monomer unit. In one example, using the claimed method allows for polymers to be selectively partially polymerized, in order to increase elasticity and flexibility of rigid polymers such as LDPE (low-density polyethylene), without the need for using additives such as plasticizers. Other applications for using the claimed method in a partial polymerization mode will be apparent to one of ordinary skill in the art.

It is well known that polymerization reactions in the presence of a catalyst will always run to the maximum extent of polymerization possible. This is a significant limiting factor in the prior art. The claimed method allows production of molecular chains of controllable intermediate length molecules. This is a distinct advantage over conventional catalyzed reactions, such as in polymerization.

Increasing Molecular Weight

The claimed method is also capable of increasing molecular weight using techniques somewhat similar to conventional irradiation polymerization, but taking advantage of the increased efficiency of the claimed method.

Process Conditions and Configurations

Whereas the RCP 11 (FIG. 1) is the preferred embodiment for the claimed method, other X-ray sources of comparable fluence can be used. There are other configurations of X-ray sources that can be used, if they are able to generate sufficient beam current for a specific application. The throughput that the system can achieve is directly proportional to the intensity of the beam current.

In order to accommodate various irradiation schemes the X-ray source of RCP 11 can be:
1. Cylindrical, as depicted in FIG. 1,
2. Planar, or
3. Arcuate.

The reactant chemicals (feedstock or other reactants) can be in one or more of several states:
1. Gaseous,
2. Liquid,
3. Solid, and
4. Plasma.

Reactant chemicals (i.e., reactants) can be introduced: either before the material(s) to be reacted enters the irradiation volume, or can be introduced in the irradiation volume itself, or both of these steps. This is determined based on the nature of the chemical reactions and the reactants used for the chemical reaction to take place.

The material(s) to be reacted can be any one or combination of:
1. Gaseous,
2. Liquid,
3. Solid, and
4. Plasma.

Processing can take place at various pressures, such as:
1. Atmospheric pressure
2. Sub-atmospheric pressure (partial or high vacuum)
3. Above atmospheric pressure Processing can take place at various temperatures, such as:
1. Ambient temperature,
2. Above ambient temperature, or
3. Sub-ambient temperature.

Following the reactive process, separation of the resulting products can be required. In some cases, precipitates will form.

The claimed method can be advantageously used in conjunction with either one or both of catalysts and controlled atmospheres in addition to the process conditions described above.

The radiation level for the reactive process should be between 1.8 electron Volts (eV) and 1.22 million eV. It is recognized that Uranium has the highest naturally occurring bond at 115.6 KeV. However, lower energy bonds exist. The bond energy for Hydrogen is 1.892 eV. The preferred, maximum operating voltage for the claimed method is set at approximately 1.22 million electron Volts (MeV). The reason for this is that at a slightly higher energy, 1.22 MeV, the pair-production threshold is crossed and materials can become radioactive. This is generally undesirable, except in some situations, such as transmutation of existing radioactive materials and radioactive waste. The structure of the RCP can be manufactured for operation at voltage up to and in excess of 10 million Volts if required.

Exemplary Reaction

An exemplary reaction involves a waste stream that contains a substantial amount of sodium in the form of sodium sulfate diluted with water. Release of this material into the environment is usually illegal, so it is desirable to conduct a reaction to convert the sodium sulfate into a form more suitable for one or both of disposal and discharge. If sodium sulfate is totally ionized, a potential problem is that it will liberate free sodium in the presence of water, thus potentially causing an explosive reaction, depending on the various concentrations.

However, in one example, the claimed method resolves this problem by providing a safe means of decomposing the sodium sulfate in an economical fashion. In this example, ionizing radiation at an energy level up to slightly less than 1.22 MeV is provided. This is several orders of magnitude higher than is required to totally ionize sodium sulfate. The amount of beam current required is determined by the dimensions of the irradiation volume and the throughput rate through the irradiation volume 18. The minimum beam current is determined by the number of molecules present in the irradiation volume 18 of the RCP 11 at any given instant.

Traditionally, in chemical reactions, any one or combination of temperature, pressure, catalysts and consumable reactants are used to induce or increase the reactivity rate of such reactions. In the case of the claimed method, temperature is irrelevant for the following reason. As a measure of energy, electron volts directly equate to temperature. A one MeV photon carries a temperature equivalent of over 1 billion degrees C. Since this energy level is so far in excess of any temperature that can be achieved by conventional heating techniques, as normally used in the chemical industry, temperature ceases to be a factor in increasing or decreasing reaction rates when viewed in light of the claimed method. Experiments conducted by the present inventor have shown that, in this type of system, over the pressure range of $10^{-2}$ Torr (1.33 Pascals) to 100 psig (619,000 Pascals), no significant change in reactivity rate was observed.

In the exemplary reaction, in the irradiation volume 18 of the RCP 11, the X-ray radiation first breaks down the sodium sulfate into sodium, sulfur and oxygen, and simultaneously breaks down the water into hydrogen and oxygen. With the addition of chlorine, this mix will recombine into dilute sulfuric acid, sodium chloride, and water as follows:

$$2Na_2SO_4 + 4Cl + 2H_2O > 2H_2SO_4 + 4NaCl$$

In this reaction, the sodium chloride (NaCl) will combine with water ($H_2O$) and amounts above the saturation level will form a precipitate. It is important to note that this reaction will not take place if one were to just mix chlorine into the sodium sulfate. But, in the presence of sufficiently high energy radiation, where the constituents of this reaction will totally ionize when desired and then recombine, they will do so at their preferred lowest energy state.

By controlling the amount of chlorine injected into this reaction, it is possible to reach a balance where all the sodium is bound to a corresponding molar amount of chlorine. Excess chlorine is not desirable as it would vent as it as a toxic gas, while an insufficient amount of chlorine would result in losing control of the sodium bonding process. The production of a sodium chloride precipitate is therefore preferable.

In the foregoing example, the amount of chlorine injected can be controlled using the feedback-based control system described above, which would include a chemical sensor 42 such as a spectroscope or chromatograph capable of detecting the presence of free chlorine gas. The presence of free chlorine gas would indicate that too much chlorine has been injected. This would cause the feedback processor to reduce the level of chlorine injection to just below the point at which free chlorine is liberated. This represents the optimal injection ratio of chlorine into the sodium sulfate solution.

In the foregoing example, the end products of the reaction are sulfuric acid and sodium chloride, which is common table salt. The sulfuric acid is immediately diluted by the excess quantities of water present in the waste stream. If its concentration should rise to an unacceptable level, the solution can be buffered or neutralized to reduce the ph to neutral. The sodium chloride will mix with free water until it forms a saturated solution, at which point the sodium chloride will precipitate out of the solution.

It will be apparent to one of ordinary skill in the art that this process can easily be applied to many other chemical reactions and the reaction given here is merely exemplary.

More complex reactions, including those that have intermediates, are accommodated with equal ease by the claimed method. The time scale in which these chemical reactions occur is substantially shorter than an X-ray irradiating pulse, thus allowing multiple reactions to occur sequentially within the duration of such pulse.

X-Ray Generating Apparatus

Figure 2:
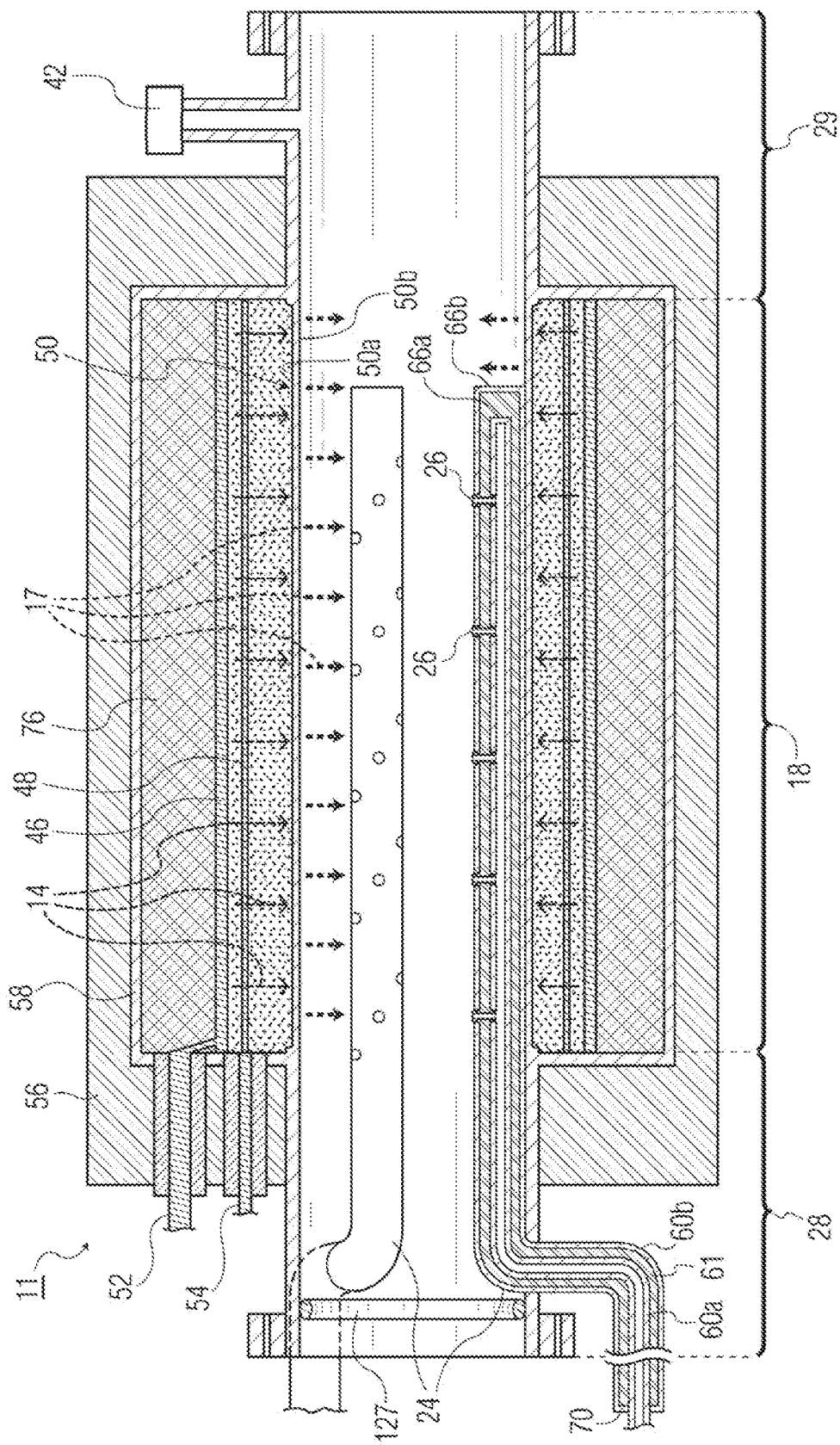
FIG. 2 is a cross-section of a Reaction-Inducing Chemical Processor (RCP), which is shown diagrammatically, including electrical feedthroughs, as a component of the system of FIG. 1, and is taken at the arrows marked as FIG. 2 in FIG. 3.

FIG. 2 shows a Reaction-Inducing Chemical Processor (RCP) 11. An RCP 11 uses a transmission-type X-ray source in conjunction with reactant measuring, control, and injection systems such as described above in connection with FIG. 1. The X-ray source of the RCP 11 has an electron gun. As shown in FIG. 2, RCP 11 preferably comprises a cold field emission cathode 46 and a grid 48. The operating conditions for such a cold cathode field emission source should be at temperatures of less than the point of the onset of thermionic emission, at approximately 1600 degrees Fahrenheit or approximately 871.1 degrees Celsius. Above a temperature of approximately 871.1 degrees Celsius, the cold cathode field emission source becomes a thermionic emitter and such operating temperature would render the X-ray source non-operational.

Such an electron gun can achieve a theoretical maximum current density of approximately 80,000 Amps/cm$^2$ in the pulse mode, which ultimately allows high levels of irradiation due to the high fluence created by the large amount of electrons used to create the X-ray beam. In practical applications, the cathode 46 is never loaded to its theoretical maximum, but rather to some lesser value. For instance, the RCP 11 can achieve high X-ray photon energies of typically 0.1-5 MeV, and a high beam current that can typically range from KiloAmps to many MegaAmps. The system can operate at lower current levels, which are dependent on the fluence requirements of the specific reaction.

Referring to FIG. 2, in operation, the cathode 46 is charged by the power supply 38 of FIG. 1, or some other power-supply which meets the voltage, current, risetime and pulse repetition-rate requirements. A bias resistor (not shown) is connected between the cathode 46 and the grid 48 and is used to create a voltage on the grid 48 so that the tube is normally in a standoff condition (not conducting). When a control signal of ground potential is applied to the grid 48, the grid releases control of the cathode 46 and the cathode discharges. Electrons 14 then travel from the cathode 46 to the anode 50. When they strike the anode 50, they create Bremsstrahlung X-radiation 17. When they hit the anode 50, a mixture of X-radiation 17 and secondary electrons (not shown) are liberated from an X-ray emitting surface 50b of the anode 50 in an isotropic fashion. To control the Bremsstrahlung spectrum and penetration depth of incident electrons 14, the thickness of anode 50 is controlled relative to the cathode voltage. The anode thickness in the region of the irradiation volume 18 is preferably controlled with regard to the penetration depth of the incident electrons so that the preponderance of the energy transmitted from an electron-receiving surface 50a of the anode 50, through the anode 50, to an irradiation volume 18 beyond the anode 50, is in the form of X-radiation 17. Therefore, as shown, the anode 50 typically has a thinner wall section in the region of the irradiation volume 18, compared with inlet section 28 and outlet section 29, as shown in FIG. 2, to achieve a degree of control over the desired transmitted Bremsstrahlung spectrum.

Cathode voltage is supplied through cathode electrically insulated vacuum feedthrough 52, and grid voltage is supplied through grid electrically insulated vacuum feedthrough 54. Both feedthroughs 52 and 54 are electrically insulated and high vacuum sealed, and penetrate the biological radiation shield 56 and housing 58.

There are several critical conditions that must be met when designing a grid for an RCP 11. They are:

1. The grid-cathode spacing must be constant across the length of the grid. This is usually accomplished by placing the grid under high tension or building it with a rigid structure.
2. The number of elements in the grid must be high enough to ensure a constant and uniform electric field in the grid-cathode region.
3. There must be no sharp edges or burs anywhere in the grid structure; individual elements can be round, flat or high aspect-ratio elliptical shapes.

All edges are preferably fully radiused. In this context, fully radiused means that the edge in question has a radius, equal to half the thickness of the material. The actual implementation of these design rules is determined by the size of the grid being built.

It will be apparent to one of ordinary skill in the art that other radiation sources can be used instead of a cold cathode field emission X-ray source. An alternative to using an RCP 11 configured as a cold cathode field emission X-ray source is to use a plurality of conventional X-ray sources to replace the aforementioned cold cathode field emission X-ray source. It is also possible to use a nuclear radioisotope source.

Radiation-Shielded Injector Sub-System

Referring again to FIG. 1, in order to preserve the molecular structure of reactant 22a prior to injection, it is necessary to provide an X-radiation shielded injection means. This prevents premature dissociation, or premature partial ionization, of the injected reactant 22a prior to one or both of introduction of the feedstock reactant 20 into the irradiation volume 18 and introduction of reactant 22a to one or more other reactants. As shown in FIGS. 1-4E, the requirements for a shielded injection means are preferably met by providing concentric pipes 60a and 60b with an X-ray radiation shielding material, typically lead or another high atomic number element, filling the interstitial space between the pipes; such an assembly is shown at 24 in FIGS. 1 and 2. The pipes 60a and 60b are typically stainless steel or some other non-reactive material that is compatible with, and not affected by, the reactants 20, 22a and 22b or the radiation environment in irradiation volume 18.

When considering shield design for the radiation-shielded injector pipe 24, it is desirable to consider the X-ray attenuation provided by the inner and outer pipe walls 60a and 60b, although in many cases, their contribution to the overall shielding can be minimal.

Figure 3:
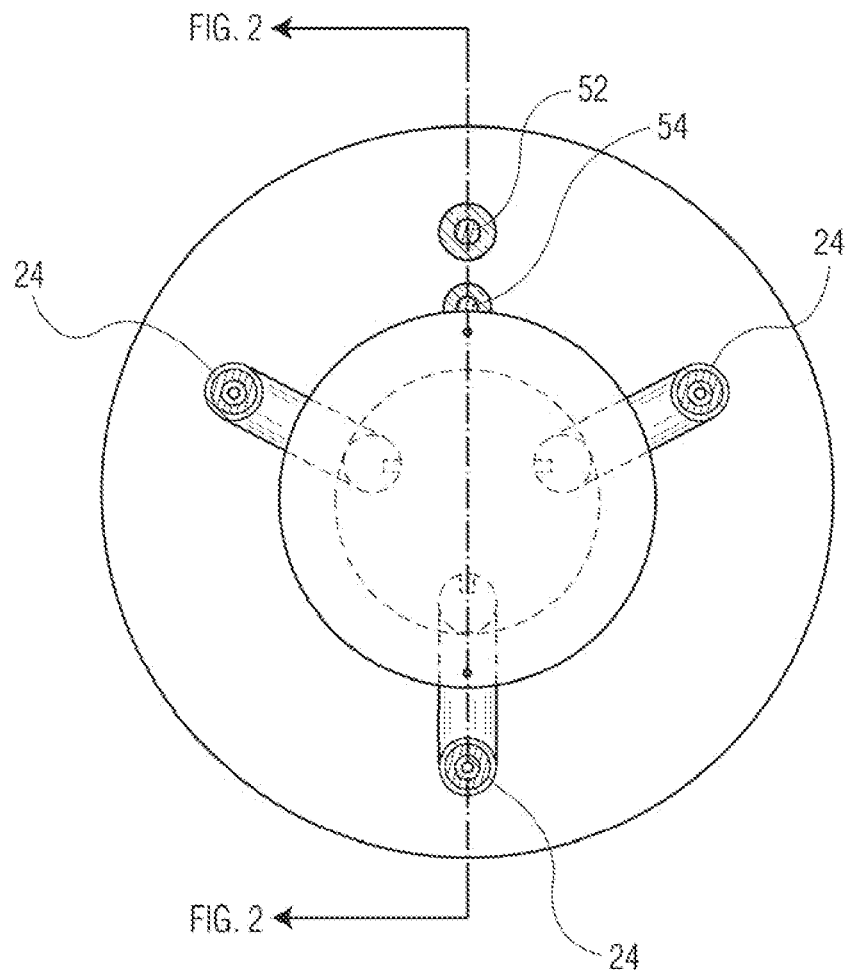
FIG. 3 is an end view of the input side of the Reaction-Inducing Chemical Processor (RCP), of FIG. 2.

FIG. 3 shows an end view of the RCP 11 of FIG. 2, in which a plurality of radiation-shielded injector pipe assemblies 24 are uniformly arranged around a common central axis of RCP 11 and located in the outer region of the irradiation volume 18. The view of FIG. 3 shows the inlet end of RCP 11, which corresponds to the left side of FIG. 2.

Figure 4A:
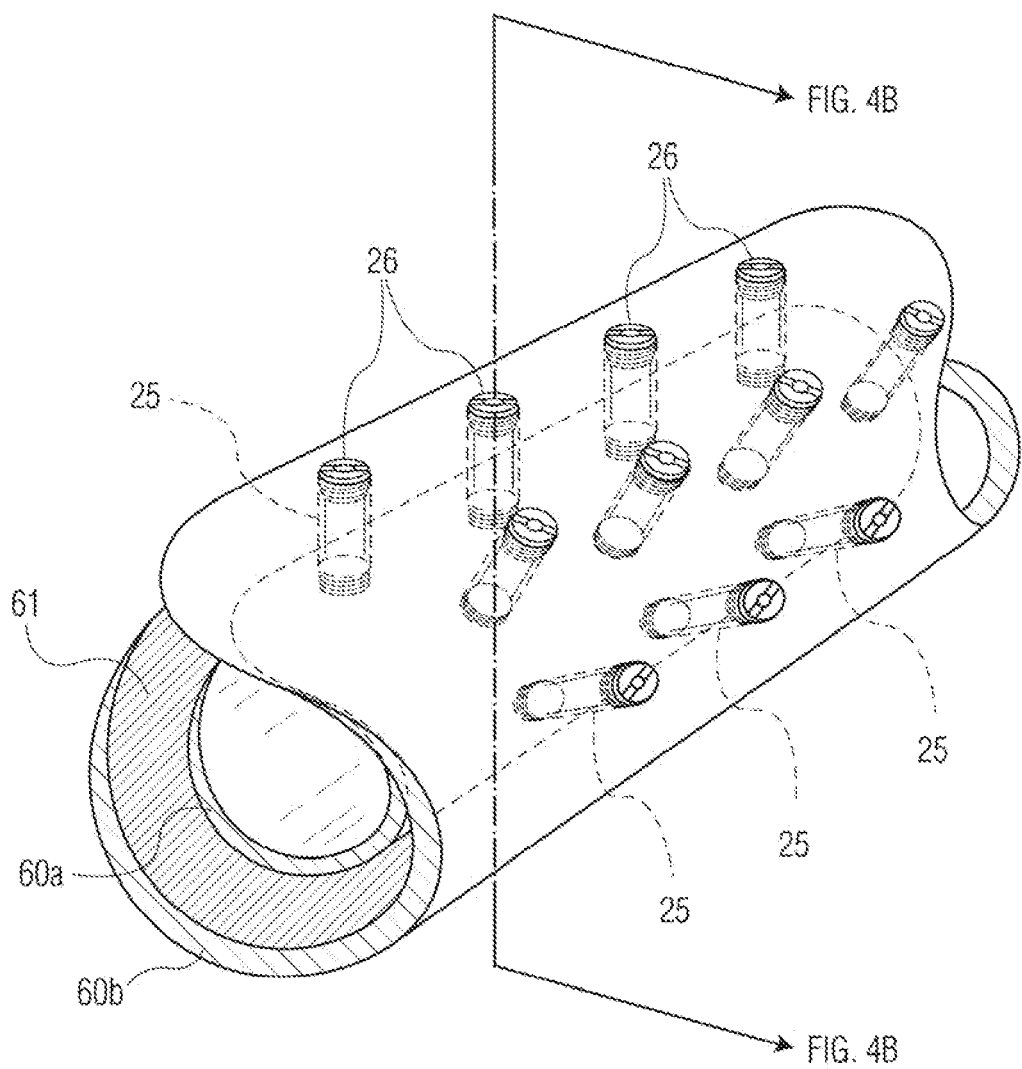
FIG. 4A is a section in perspective of a radiation-shielded injector pipe assembly 24 of FIGS. 1-3.
Figure 4B:
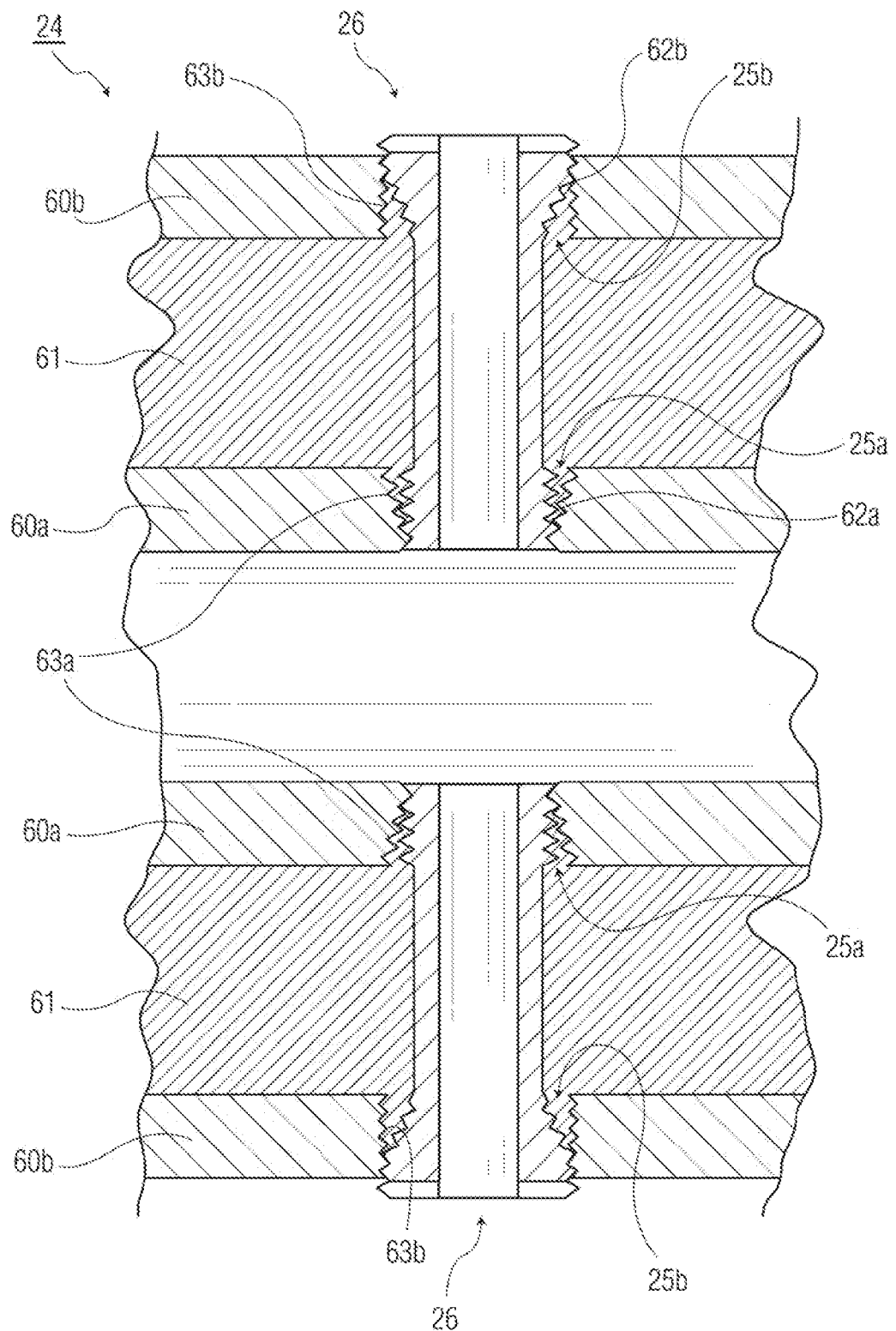
FIG. 4B is a cross-section of the radiation-shielded injector pipe of FIG. 4A taken at the arrows marked FIG. 4B in FIG. 4A.
Figure 4C:
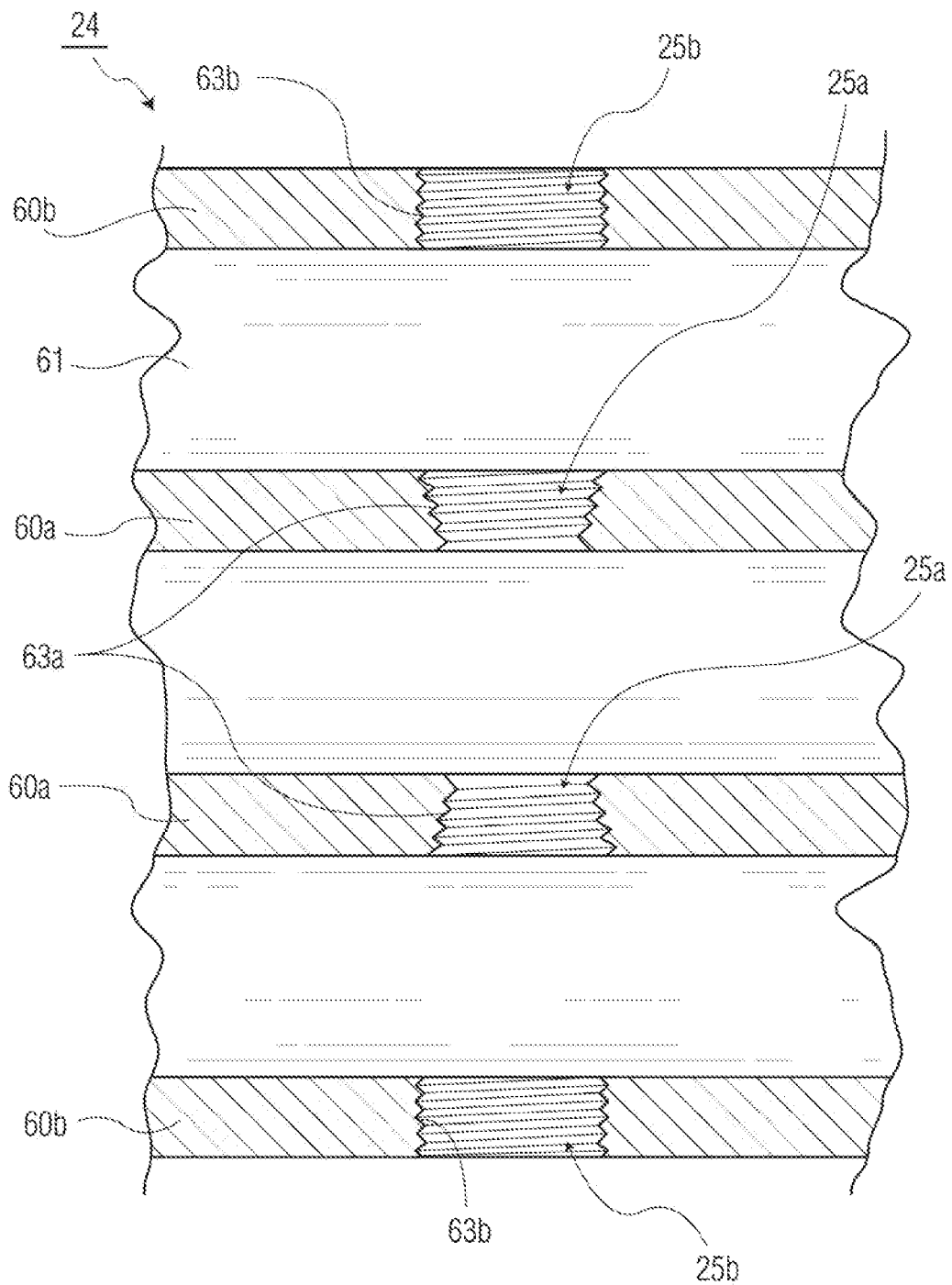
FIG. 4C is similar to FIG. 4B but omits injection apertures 26 and shield material 61 in FIG. 4B.
Figure 4D:
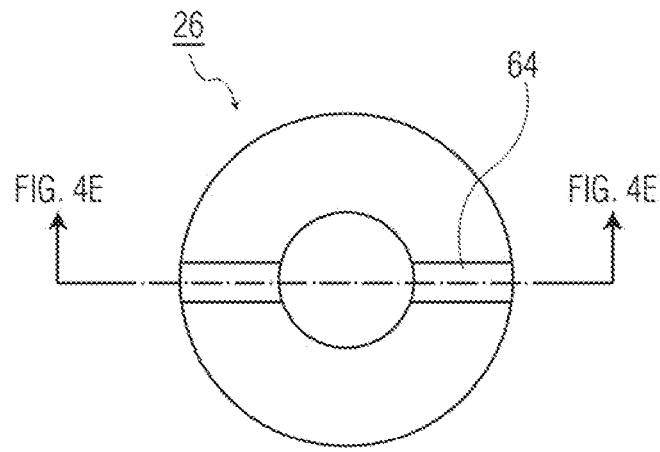
FIG. 4D is a top view of an injector aperture insert 26 of FIGS. 4A and 4B.
Figure 4E:
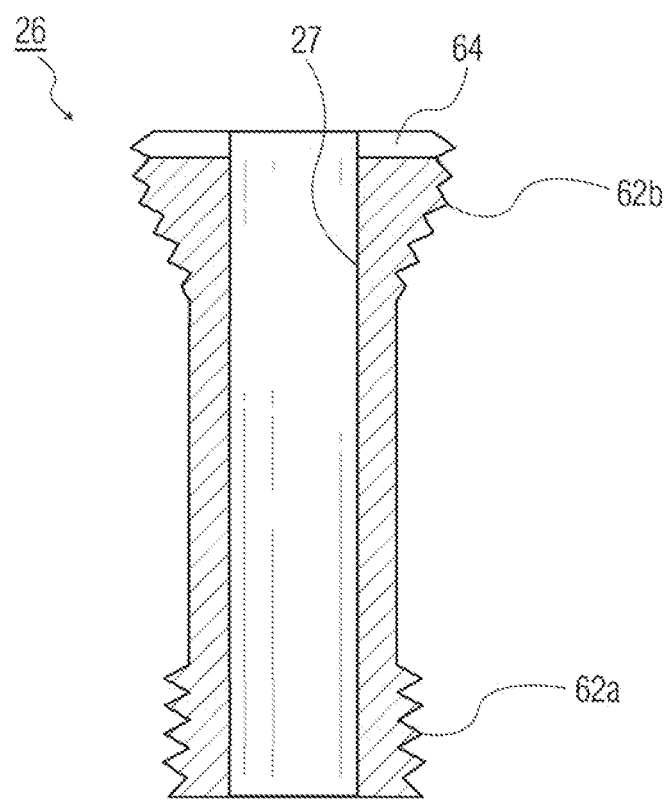
FIG. 4E is a cross-section of the injector aperture insert 26 of FIG. 4D taken at the arrows marked FIG. 4E in FIG. 4D.

FIGS. 4A-4E show details of the construction of the radiation-shielded injector pipe assembly 24. FIG. 4A shows a series of openings 25 in inner pipe 60a, outer pipe 60b and intermediate shield material 61, with injector aperture inserts 26 installed in the openings 25. As shown in FIG. 4E, each injector aperture insert 26 has a reactant-delivery aperture 27 for delivery of reactant. Pipes 60a and 60b are formed of non-reactive material such as stainless steel. Non-reactive materials should be used to manufacture the injector pipe assembly 24, as reactive materials would contaminate the reaction. With reference to FIGS. 4B and 4C, the openings for injector aperture inserts 26 can be formed by drilling holes through both pipes 60a and 60b, in concentric axial alignment with each other, and threading the openings in those pipes. In one example, injector aperture inserts 26 are typically made of the same non-reactive material as pipes 60a and 60b. The injector aperture inserts 26 are respectively installed through threaded inner and outer threaded holes 25a and 25b of opening 25 (FIG. 4B) in the inner and outer pipes. A preferred method of manufacturing the injector aperture inserts 26 and of sealing them to both the inner and outer pipes 60a and 60b is now described.

As shown in FIG. 4B, each threaded hole 25a on the inner pipe 60a has a fine-pitch tapered thread 63a. Each threaded hole 25b in the outer pipe 60b has a similar fine pitch thread 63b, but in this case it is a straight-walled thread. Each pair of inner and outer threaded holes 25a and 25b receives a respective injector aperture insert 26. As shown in FIG. 4E, the injector aperture insert 26 has threads 62a and 62b formed on its exterior surface. The injector aperture insert thread 62a that mates with thread 63a in the inner pipe 60a can be a straight-walled thread of the same pitch, while the thread 62b which engages the outer pipe thread 63b can be tapered, as shown in FIGS. 4B and 4E.

The purpose of the dual-threaded injector aperture insert 26 is to simultaneously create seals with both pipes 60a and 60b by jamming the respective male threads 62a and 62b of the injector aperture insert 26 into the corresponding female threads 63a and 63b of the inner and outer pipes 60a and 60b. Tapered threads are preferable in that the seal they achieve is comparable to the seal that is achieved with conventional tapered pipe thread seals (e.g., U.S. National Pipe Thread [NPT]), as commonly used in plumbing and other systems. In manufacturing the injector aperture insert, it is important to control the start point of the threading operations for all threads involved. This is to ensure that an optimal seal can be obtained.

As best shown in FIGS. 4D and 4E, a slot on the outer end of the aforementioned injector aperture insert 26 provides access for a flat-blade screwdriver or spanner-wrench for tightening the injector aperture insert 26 and making the aforementioned seal. A torque wrench is preferably used to ensure that the correct tightening force is used to further optimize seal conditions. Thread sealants and thread-locking compounds can be used if they are compatible with the reactants 20, 22a and 22b and other process conditions.

Referring to FIGS. 4B and 4E, as alternatives to using the straight threads 62a, 63b and tapered threads 62b and 63a, other combinations of straight and tapered threads or variable-pitch threads can be used to provide the required seal between the inner pipe 60a and the outer pipe 60b and the injector aperture insert 26. As alternatives altogether to the use of threads, the aperture injector inserts 26 can be brazed or soldered to inner and outer pipes 60a and 60b using well known techniques.

In FIG. 2, the right-hand shown ends of the respective inner 60a and outer 60b pipes are fitted with sealed end caps 66a and 66b which isolate X-radiation shield material 61 from the reactants 20, 22a and 22b. As mentioned above, X-radiation shield material 61 can comprise lead or other high atomic number elements. End caps 66a and 66b are preferably TIG-welded to respective inner 60a and outer 60b pipes, where TIG is an abbreviation for tungsten inert gas.

Once the inner 60a and outer 60b pipes are connected by the injector aperture inserts 26, the next step in fabricating the radiation-shielded injector pipe assembly 24 is adding the X-ray radiation shield material 61. The resulting assembly is oriented vertically and molten shield material is slowly poured into the interstitial space between the pipes 60a and 60b, filling such interstitial space completely. During this process, it is desirable to use secondary heating of the pipes and injector aperture inserts to ensure that the molten shield material stays molten until the interstitial space is filled completely. It is further desirable to apply a low vacuum to the interstitial space to ensure that there are no bubbles or voids in the shield material 61, as is commonly done in critical casting processes. Vibration can also be advantageously used to ensure that there are no voids in the shield material 61.

The resulting assembly 24 is finished with the addition of an end cap 70 (FIG. 2) on an inlet end of the inner 60a and outer 60b pipes, with a hole to allow passage therethrough of the inner pipe. The foregoing end cap 70 seals the X-ray shield material 61 into the injector assembly.

The completed radiation shielded injector assembly 24 is preferably spot-welded to the inner wall of the RCP anode 50 (FIG. 2), although other means of attachment will be apparent to those of ordinary skill in the art.

The size and location of the injector aperture inserts 26 is determined by the desired injection pattern. For instance, it can be desirable to compensate for decreasing pressure within the inner pipe 60a as the distance within the pipe extends from an inlet. Such compensation would assure a more uniform injection of reactant from each unit length of the pipe. Compensation can take the form of an increasingly larger aggregate area provided by outlet injector inserts 26 along the length of the pipe assembly 24. For instance, the number of outlet injector inserts 26 per unit length along the pipe assembly 24 can be increased or respective sizes of the outlet injector inserts 26 along the pipe assembly 24 can be increased, or both. Alternatively, or in addition to the foregoing techniques, a pipe assembly 24 could input reactant at both of its ends to compensate for decreasing pressure within the inner pipe 60a. This would preferably necessitate the use of a 2-port splitter (not shown) in the reactant 22a supply line to enable a single flowmeter 30a.

Figure 5:
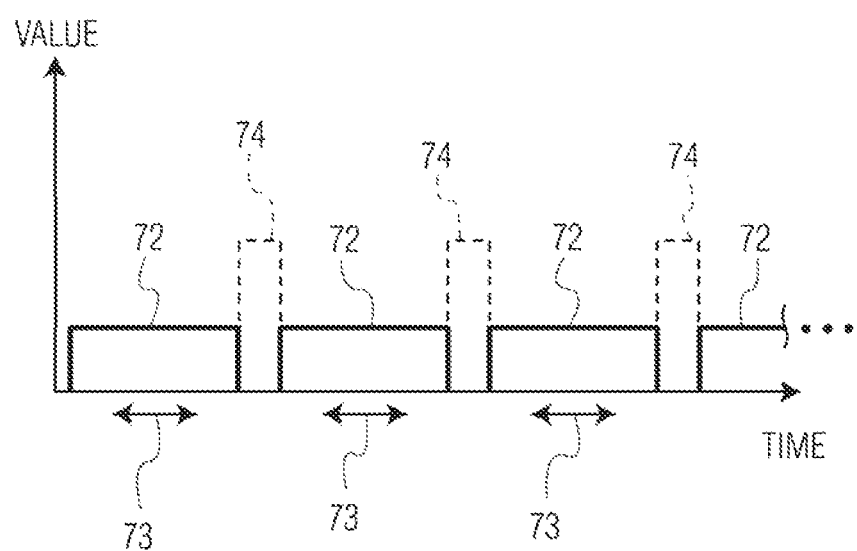
FIG. 5 is a timing diagram of X-ray and reactant-injection pulses.

Referring back to FIG. 1, it is necessary to provide a means to intersperse the injection of reactants 20 and 22b, and 22a, through the radiation shielded injector pipe assembly 24 and the application of X-ray irradiation pulses. To accomplish this, FIG. 5 shows a respective reactant-injection pulse 72 that precedes each respective X-ray pulse 74, assuring that there is time for the injected reactants 20, 22a and 22b preferably fully intermix prior to the X-ray pulse 74 in the RCP 11. The pulse width of the reactant-injection pulse 72 is adjustable, as shown by double-headed arrows 73, to facilitate the foregoing process. The width of reactant-injection pulse 72 is adjustable, whereas the width of X-ray pulse 74 is fixed.

The foregoing pulse-width relationships prevent premature dissociation of the injected reactant 22a. The preferred embodiment uses non-overlapping pulses of reactant and X-radiation as shown in FIG. 5, to allow a maximum time for intermixing of reactants prior to dissociation and the subsequent desired reaction or reactions.

In the X-ray irradiation pulses as just described, the X-ray irradiation can be supplied as bursts of X-ray pulses rather than a single pulse. This is done to increase the electrical efficiency of the RCP 11.

Figure 4F:
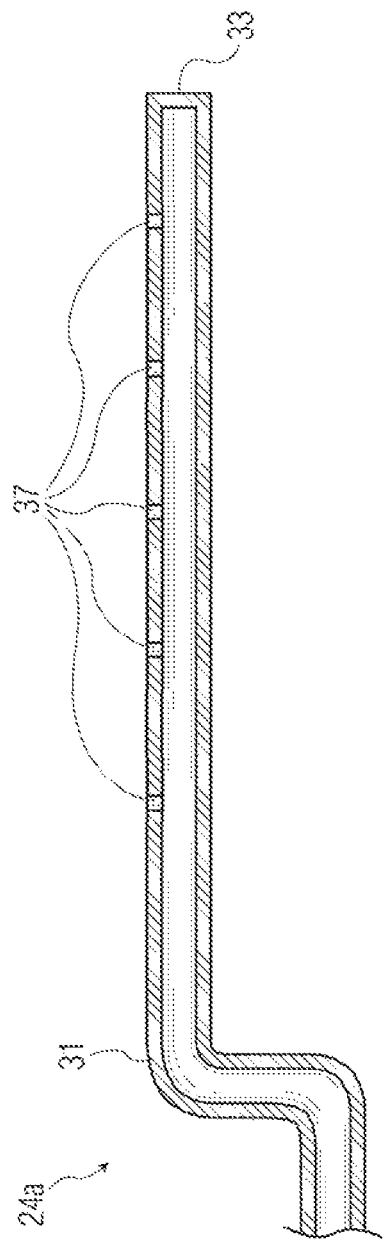
FIG. 4F is a cross-sectional view of an exemplary single-wall injector pipe assembly with apertures.

In some circumstances, particularly where partial ionization is used, the radiation-shielded injector pipe 24 can be modified to be a single, solid-walled pipe 24a as shown in FIG. 4F, where the wall thickness and composition are chosen to provide appropriate X-ray shielding of the reactant or reactants being injected from the modified injector pipe into the irradiation volume 18. Consideration should be given to potential chemical reactivity of the modified pipe with the reactants or feedstock. Selection of an appropriate wall thickness and composition will be apparent to those of ordinary skill in the art.

When a single-walled injector pipe 24a is chosen, the injector aperture inserts 26 of pipe assembly 24 are no longer required. FIG. 4F shows an example of a single-walled injector pipe 24 having a wall thickness 31. In this example, the pipe includes a plurality of apertures 37 and an end cap 33. The wall material and thickness are chosen to provide shielding for the injected reactants. When adequate shielding cannot be obtained with a single wall injector pipe, then the double wall design 24 (e.g., FIGS. 4A-4E) with intermediate shield material 61 should be used.

Enhanced Mixing of Reactants

Figure 6:
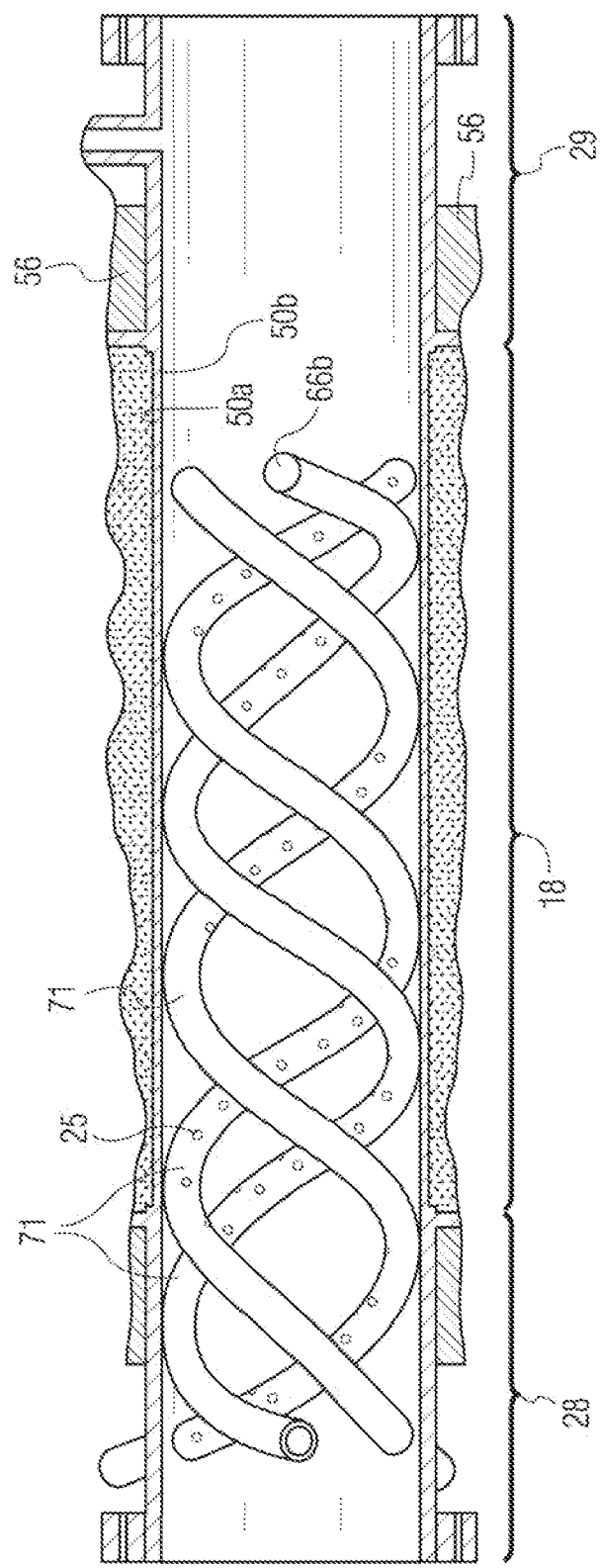
FIG. 6 is fragmentary side view, partially in cross-section, of the Reaction-Inducing Chemical Processor (RCP) of FIG. 2 in which the straight radiation-shielded pipe assemblies 24 are replaced with spirally-configured radiation-shielded injector pipes 71.

As shown in FIG. 6, the radiation-shielded injector pipe assemblies, previously shown as 24 in FIGS. 1-4E or as 24a in FIG. 4F, are now given a spiral configuration, numbered as 71, and are of similar construction to radiation-shielded injector pipe assemblies 24 or 24a except for being of a spiral configuration rather than straight as shown in FIGS. 1, 2 and 4F. The purpose of the spiral configuration is to impart a spiral flow to the injected reactant 22a. Such a spiral flow enhances the mixing of reactant 22a with feedstock reactant 20. Other types of spiral structures, such as spiral fins (not shown), to impart a spiral motion to feedstock reactant 20 and either or both of reactants 22a and 22b are allowable as will readily be appreciated by persons of ordinary skill in the art.

Output Flow Reinjection Loop

Figure 7:
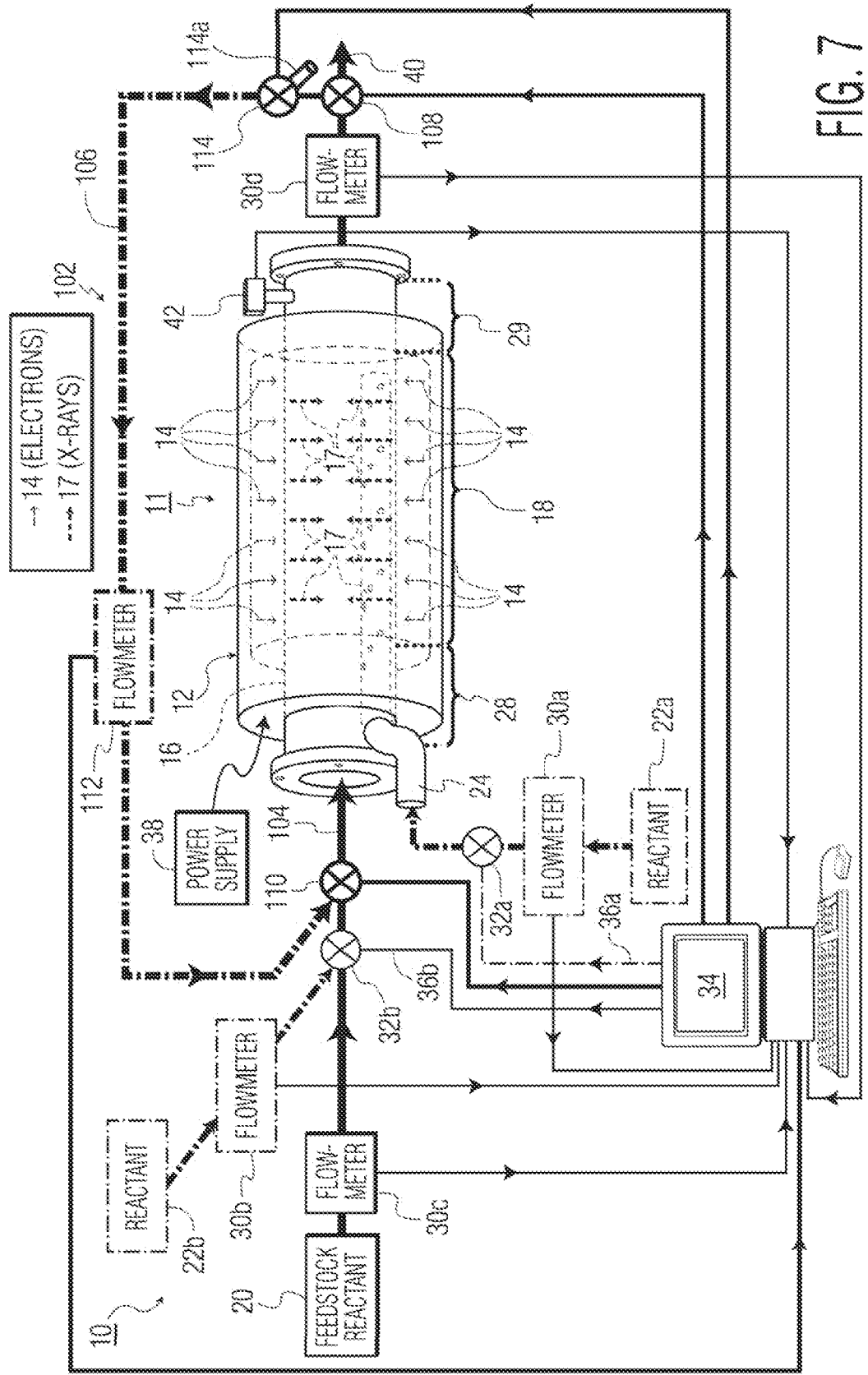
FIG. 7 is similar to FIG. 1 but includes an additional output flow re-injection loop.

FIG. 7 shows a system 100; which varies from system 10 of FIG. 1 by including an output flow reinjection loop 102 and associated control lines. Therefore, only the output flow reinjection loop 102 and associated control lines are described here; these additional parts are shown with slightly heavier lines than similar parts in the remainder of the figure, which corresponds to FIG. 1, to make it easier to distinguish the added parts.

Referring to FIG. 7, in some processes, it is desirable to recirculate some part of the output 40 of RCP 11 back to the primary input 104 of RCP 11. The output flow reinjection loop 102 includes a recirculation pipe 106, whose contents are controlled by output flow withdrawal valve 108 and an output flow reinjection mixing valve 110. The reason for having two valves 108 and 110 is for isolation and to prevent any of output flow 40 in the reinjection loop 102 from stagnating therein. These valves 108 and 110 normally operate synchronously to prevent the foregoing stagnation condition. The reinjection loop 106 includes a flowmeter 112, whose output data is sent to host computer 34. The reinjection can be either through primary input 104 via valve 110, or through one or more radiation-shielded injection pipe assemblies 24, or some combination thereof. The foregoing modifications can require some minor changes to the plumbing of the system 10 as such modifications will be readily realized by persons of ordinary skill in the art.

The recirculation loop 106 also contains a blow-down valve 114, which preferably is physically located directly adjacent to output flow withdrawal valve 108. The purpose of the foregoing blow-down valve 114 is to allow the output flow reinjection loop 102 to be cleared of any contents. This is accomplished by closing the output flow withdrawal valve 108, opening the blow-down valve 114, injecting a suitable compressed gas via inlet port 114a to blow any contents out of the output flow reinjection loop 102, and finally closing the output flow reinjection valve 110 to complete the blow-down cycle. The compressed gas used for blow-down is chosen to be non-reactive with any chemicals present in reinjection loop 106. The entire blow-down cycle is controlled by host computer 34, and typically occurs at the completion of a processing sequence.

Batch Processing

Figure 8:
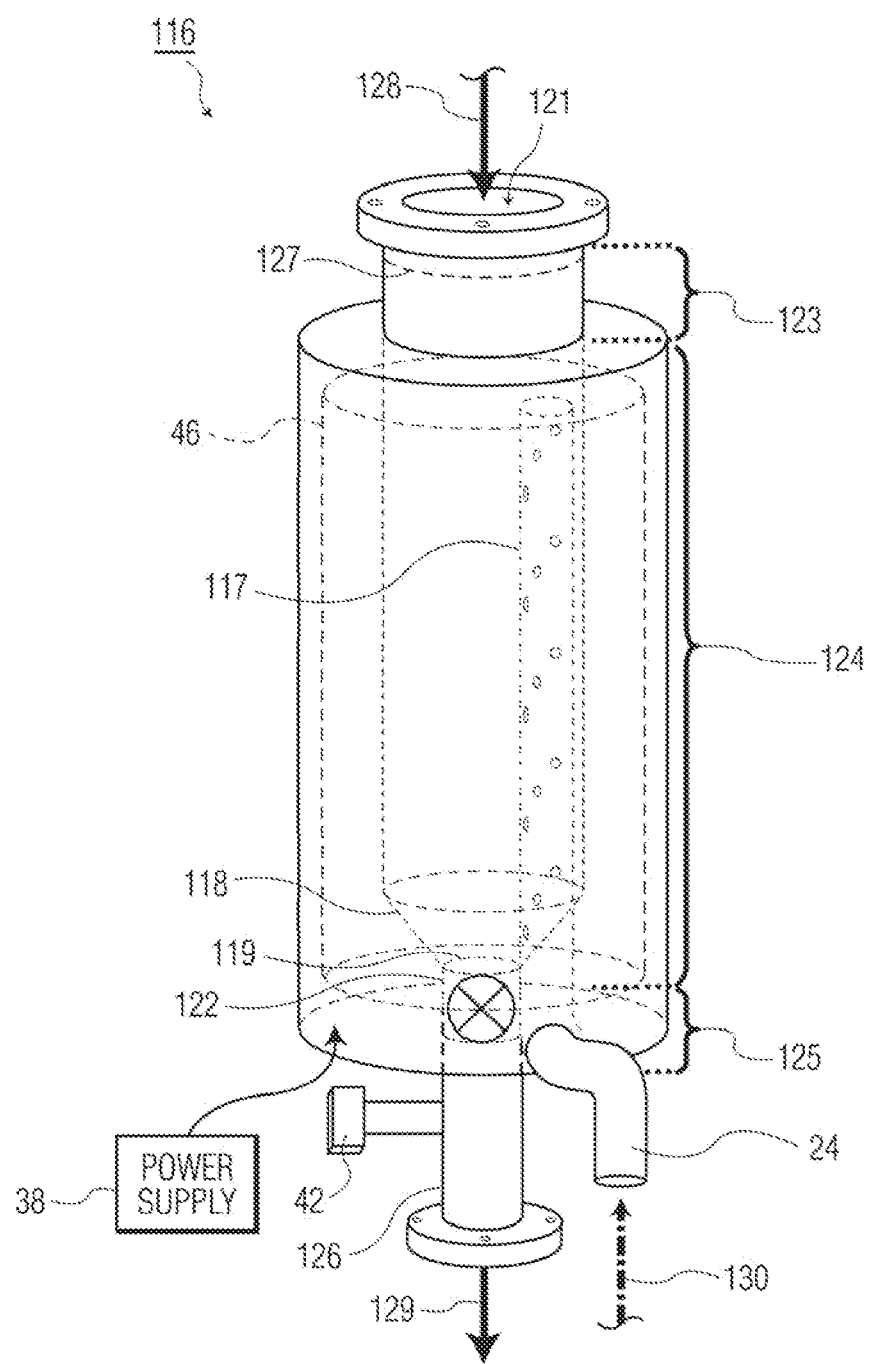
FIG. 8 is a simplified diagrammatic view, partially in block form, of an alternative Reaction-Inducing Chemical Processor (RCP) for use in a batch-processing mode, with electrical, feedthroughs omitted for clarity.

The RCP 11 can also be used as a batch processing device, in contrast with the flow-through version described above by preferably vertically orienting an RCP 11 to achieve the orientation shown at 116 in FIG. 8, and providing the following modifications. In this configuration, the entirety of the RCP 116 becomes the reaction vessel by sealing the bottom of pipe 117 with a conical bottom plate 118 to eliminate material flowing through the RCP 116. The bottom plate 118 preferably has a shallow, conical configuration, with an outlet port 119 located at its downwardly-pointing apex to facilitate draining the batch-processing RCP 116. The outlet port 119 normally has a valve 122, which is schematically shown as a cylinder. The juncture between outlet port 119 and valve 122 is preferably designed to minimize volume for accumulation of unreacted material, and is in the irradiation volume 124, so as to assure that all materials in the batch processing RCP 116 are reacted properly. The batch processing RCP 116 can also be drained by suction from its inlet port 121.

It is preferable to have the inlet end of the radiation-shielded injector pipe assembly 24 at the bottom of the resulting reaction vessel as shown in FIG. 8. The reaction vessel is configured so that reactants and reaction products have no net movement through the irradiation volume along an axis. The inlet paths 128 and 130 and the outlet path 129 correspond to the same-numbered paths in FIG. 1, and therefor description of the components associated with those paths is found in the above description of FIG. 1.

The RCP 116 includes an inlet section 123, an irradiation volume 124, and an outlet section 125. One or more other reactants, such as reactant 22a enter through the injector pipe assembly 24 at reference numeral 130.

The batch processing RCP 116 can optionally be configured with a wash-down system (not shown) to allow cleaning the interior surfaces between batches. This is particularly important if more than one process is run on the same piece of equipment.

Energy Storage Enhancement of RCP

Figure 9:
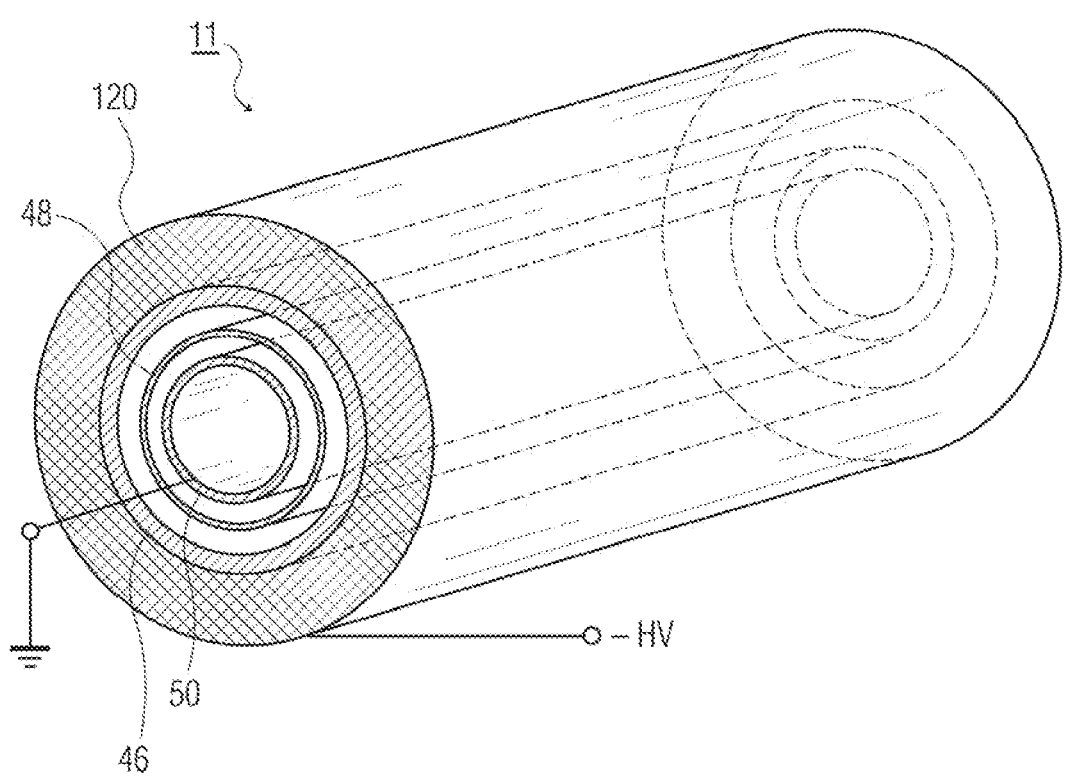
FIG. 9 is a simplified perspective view of a Reaction-Inducing Chemical Processor (RCP) with an energy enhancement modification.

FIG. 9 shows a Reaction-Inducing Chemical Processor (RCP) 11 enhanced with an energy storage capacitor 120 integrated directly into its structure. The capacitor 120 is provided to ensure that the RCP 11 is able to get a sufficient amount of energy into its irradiation volume 18 (FIGS. 1 and 2) in a very short period of time. Given that electricity travels at or near the speed of light, which equates to approximately one foot (30.48 cm) per nanosecond, and the time available to do this is only a few nanoseconds, it becomes clear that the energy storage capacitor 120 should be proximate to the electron gun of the X-ray source of RCP 11.

This issue of delivering energy very quickly is addressed in the RCP 11 of FIG. 2 by adding a coaxial capacitor to the external surface of the cathode 46, as shown in FIGS. 2 and 5. The external surface of the cathode 46 offers a very large, low inductance means of connection for the capacitor. The entire inner surface of the first wrap of the capacitor 120 is electrically, chemically and mechanically bonded so as to be in intimate electrical contact to the cathode 46. The capacitor is then wound around the cathode 46 until it has a suitable diameter to provide the required capacitance to store the desired amount of energy.

It should be noted that the cathode-grid interelectrode space is a capacitor by itself and stores a considerable amount of energy. A three-inch (75 mm) diameter structure as formed by the juxtaposition of the cathode 46 and the grid 48 stores approximately 200 picofarads per foot (30.48 cm). A two foot (61 cm) diameter device would store 1.6 nanofarads per foot (30.48 cm) if operated at 500,000 Volts and would store approximately 4 Kilojoules per foot in the cathode-grid interelectrode space. The energy is determined by the well-known equation:

$$J = CV^2/2$$

External Biological Radiation Shielding

As will be apparent to persons of ordinary skill in the art from the present specification, appropriate external biological radiation shielding 56 (FIG. 2) when practicing the claimed method can be needed. The design of such shielding can follow the well-established practices used in medical radiation facilities. Typically, a lead shield of 0.25 inch (6.35 mm) per 100 KeV, plus an optional safety factor typically of an additional 30 percent thickness would be used. While the additional thickness attributable to the safety factor is not necessary, it ensures that the radiation level emitted from this device is always substantially below background radiation limits. The geometry of the apparatus used in the invention is usually a long, high-aspect ratio design, since such a design provides maximum trapping of radiation emerging generally on-axis.

It will be apparent to a person of ordinary skill in the art that biological radiation shielding 56 is required around the entire exterior of the RCP 11 (FIG. 1) for biological safety purposes. However, as described above, various embodiments of the present invention require one or more radiation-shielded injector pipe assemblies 24 for introducing reactants 22a into the irradiation volume 18 (FIG. 1) so as to allow those reactants to be protected from irradiation and the resulting negative consequences of premature ionization.

In general practice, radiation shielding is not limited to lead. A wide range of materials are used as radiation shielding and standard practices regarding the selection of a shield material can be used. If lead is chosen as shield material, in order to be compliant with various international regulations regarding the use of this material, it must be encapsulated within an impervious enclosure to keep it out of contact with the ambient environment. Materials such as fiberglass and aluminum are suitable materials for this application. Because such encapsulation materials are located outside the shield, they do not deteriorate as a result of radiation exposure. In some cases, where space is not a consideration, shield materials such as concretes and cements can be used. This is most useful for very large systems as would be used in industrial and municipal applications.

Continuous Mode

While the pulse mode of operation for the X-ray source of the RCP 11 is preferred, the X-ray source can be operated in the continuous mode by de-rating the cathode current loading. In the pulse mode, the cathode 46 can be operated at current loading up to about 75,000 Amps/cm$^2$. In the continuous mode, the cathode current loading should be limited to no more than about 400 Amps/cm$^2$. Here, the term "current loading" refers to a practical maximum cathode current loading, rather than the theoretical maximum loading of the cathode. It is also noted that the same system can be run in either mode by changing the power supply output current.

The reactants can assist in cooling the anode 50 of the X-ray generation apparatus in either mode.

The claimed method can be used in many applications, including but not limited to:
1. Manufacturing of chemical products,
2. Remediation of environmental wastes,
3. Processing of radioactive wastes, and
4. Destruction of chemical weapons.

A unique characteristic of the claimed method is its universality. It can be used on combinations of solids, liquids, gasses and plasmas with virtually no modifications. Only the ancillary material handling equipment, pumps and the like are different and specific to the state of the material being processed. These units can be made small, with internal bores of substantially less than an inch (25.4 mm) on one hand and over 10 feet (3 meters) in internal diameter on the other hand. The nominally stainless steel construction (although other materials can be used), allows for a high-strength robust device that is well-suited to industrial environments.

The following list of drawing reference numbers are provided for the convenience of the reader.

REFERENCE NUMBER LIST

10. System
11. Reaction-Inducing Chemical Processor (RCP) for continuous processing mode
14. Electrons
16. Inner pipe
17. X-rays
18. Irradiation Volume
20. Feedstock Reactant
22. Other reactants 22a & 22b
24. Radiation-shielded injector pipe assembles 24 & 24a
25. Inner and outer threaded holes 25a and 25b, respectively
26. Injector aperture inserts
27. Reactant-delivery aperture
28. Inlet section
29. Outlet section
30. Flowmeters 30a-30d
31. Wall thickness
32. Mixing valves 32a and 32b.
33. End cap
34. Host computer
36. Control lines 36a and 36b
37. Apertures
38. High voltage power supply
40. Output flow
42. Chemical sensor such as a spectroscope or chromatograph
46. Cathode 48. Grid
49. Bias resistor
50. Anode; electron-receiving surface 50a; X-ray emitting surface 50b
52. Cathode electrically insulated vacuum feedthrough
54. Grid electrically insulated vacuum feedthrough
56. Biological radiation shield
58. Housing
60. Inner pipe 60a and outer pipe 60b
61. Shield material
62. Thread 62a (straight-walled thread for mating with inner pipe thread 63a and thread 62b (tapered thread for mating with outer pipe thread 63b)
63. Thread 63a (inner tapered) and thread 63b (outer straight)
64. Slot
66. End caps 66a and 66b
70. End cap
71. Spiral injector pipes
72. Reactant-injection pulse
74. X-ray pulse
76. Energy storage capacitor
100. System
102. Reinjection loop
104. Primary input
106. Recirculation pipe
108. Output flow reinjection mixing valve
112. Flowmeter
114. Blown-down valve; compressed gas inlet port 114a
116. Reaction-Inducing Chemical Processor (RCP) for batch processing mode
117. Pipe
118. Bottom plate
119. Outlet port
120. Energy storage capacitor
121 Inlet port
122 Valve
123 Inlet section
124 Irradiation Volume
125 Outlet section
126 Outlet pipe
127 Catalysts
128 Inlet path
129 Outlet path
130 Inlet path While the invention has been described with respect to specific embodiments by way of illustration, many modifications and changes will occur to those skilled in the art. Such a skilled person will realize that, whereas chemical reactions may require total or partial ionization of reactants, some percentage of what is called "reactant" herein need not be reacted, as may likely happen at the initial start-up of the process. It is, therefore, to be understood that, the appended claims are intended to cover all such modifications and changes as fall within the true scope and spirit of the invention.

What is claimed is:

1. A method for inducing chemical reactions using X-ray radiation, comprising:
    (a) generating an X-ray irradiation volume within the interior of a reaction vessel by introducing X-ray radiation into the interior of the reaction vessel;
    (b) introducing at least a feedstock reactant into the X-ray irradiation volume;
    (c) introducing at least one reactant, other than the at least a feedstock reactant, into the X-ray irradiation volume via one or more X-ray shielded injector pipes that extend into the X-ray irradiation volume; each of the one or more X-ray shielded injector pipes having a main X-ray shielded path extending along a majority of a length of the X-ray irradiation volume and having a plurality of injector apertures; each injector aperture extending transversely outwardly from the main X-ray shielded path, being spaced along said main X-ray shielded path for a majority of the length of the X-ray irradiation volume, and opening into the X-ray irradiation volume to allow said at least one reactant to reach the X-ray irradiation volume; and
    (d) inducing selective reactions to occur in said X-ray irradiation volume through control of the fluence and energy of said X-ray radiation so as to totally or partially ionize, within said X-ray irradiation volume, all or part of the at least a feedstock reactant, the at least one reactant other than the at least a feedstock reactant, and any subsequently created intermediate reactant or reactants.

2. The method of claim 1, wherein generating the X-ray irradiation volume within the interior of the reaction vessel is accomplished by introducing X-ray radiation into the interior of the reaction vessel via a cold cathode field emission X-ray source.

3. The method of claim 1 or claim 2, wherein said inducing selective reactions to occur in said X-ray irradiation volume comprises controlling the fluence and energy of said X-ray radiation so as to totally ionize all or part of the at least a feedstock reactant, the at least one reactant, and any subsequently created intermediate reactant or reactants.

4. The method of claim 1 or claim 2, wherein said inducing selective reactions to occur in said X-ray irradiation volume comprises controlling the fluence and energy of said X-ray radiation so as to partially ionize all or part of the at least a feedstock reactant, the at least one reactant, and any subsequently created intermediate reactant or reactants.

5. The method of claim 4, wherein a resulting end product with a lower molecular weight than the feedstock reactant is realized.

6. The method of claim 4, wherein a resulting end product with one or both of a greater molecular length and weight than the feedstock reactant is realized.

7. The method of claim 1 or claim 2, further comprising controlling the introducing the at least a feedstock reactant and the at least one reactant in such manner as to induce selective reactions to occur, wherein said controlling comprises measuring in real time the respective rates of introduction of said at least a feedstock reactant and the at least one reactant into the X-ray irradiation volume and adjusting in real time said rates of introduction as necessary to achieve a desired end product chemistry for a resulting end product.

8. The method of claim 7, wherein said controlling comprises measuring volumetric output flow exiting the X-ray irradiation volume and identifying the chemical composition of said end product and, in response, controlling in real time the respective rates of introducing said at least a feedstock reactant and said at least one reactant into the X-ray irradiation volume to achieve a desired end product chemistry for the end product.

9. The method of claim 8, wherein the measuring of the volumetric output flow includes determining whether undesirable byproducts have been formed.

10. The method of claim 9, wherein the determining uses a chemical sensor.

11. The method of claim 1 or claim 2, wherein:
    (a) the reaction vessel is formed as a pipe extending along an axis; and (b) said generating an X-ray irradiation volume is performed by an X-ray source encircling an irradiation section of the pipe and directing X-ray radiation into the irradiation section of the pipe.

12. The method of claim 1 or claim 2, wherein:
(a) each X-ray shielded injector pipe comprises a double-walled pipe having an inner pipe surrounded by an outer pipe with an intermediate shield material therebetween; and
(b) X-ray radiation shielding for the at least one reactant injected therethrough arises from the intermediate shield material and any shielding provided by any of the inner and outer pipes.

13. The method of claim 1 or claim 2, wherein each X-ray shielded injector pipe is a single-walled pipe.

14. The method of claim 1 or claim 2, wherein:
(a) the reaction vessel is configured to operate in a continuous processing mode;
(b) the X-ray irradiation volume extends along an axis; and
(c) the at least one reactant introduced into the X-ray irradiation volumes via the one or more X-ray shielded injector pipes is introduced into a stream of the at least a feedstock reactant flowing along said axis in the X-ray irradiation volume.

15. The method of claim 1 or claim 2, wherein:
(a) the reaction vessel is configured to operate in a continuous processing mode;
(b) said introducing at least a feedstock reactant comprises introducing at least a feedstock reactant into the X-ray irradiation volume from a location upstream of the irradiation volume so as to form a stream of the at least a feedstock reactant flowing through the reaction vessel; and
(c) said introducing the at least one reactant via said one or more X-ray shielded injector pipes is accomplished through pulsed injection of the at least one reactant into said stream of the at least a feedstock reactant upstream of the irradiation volume in such manner as to cause some level of intermixture with said at least a feedstock reactant upstream of the X-ray irradiation volume;
(d) said X-ray radiation being supplied in pulses interspersed with pulses of said pulsed injection.

16. The method of claim 15, wherein said X-ray radiation being supplied in pulses do not overlap said pulses of said pulsed injection of said at least one reactant.

17. The method of claim 15, wherein said one or more X-ray shielded injector pipes are configured in a spiral manner along a direction through the X-ray irradiation volume so as to enhance intermixture of the at least one reactant with the at least a feedstock reactant.

18. The method of claim 15, wherein said introducing at least a feedstock reactant comprises continuously mixing a plurality of reactants of the at least a feedstock reactant substantially prior to being introduced into the X-ray irradiation volume.

19. The method of claim 1 or 2, wherein said introducing at least a feedstock reactant comprises continuously mixing a plurality of reactants of the at least a feedstock reactant substantially prior to being introduced into the X-ray irradiation volume.

20. The method of claim 1 or claim 2, wherein:
(a) the reaction vessel is configured to operate in a continuous processing mode; and
(b) a portion of an output flow from the X-ray irradiation volume is injected into an inlet of the X-ray irradiation volume.

21. The method of claim 1 or claim 2, wherein said X-ray radiation is in a range from approximately 1.8 electron volts to approximately 1.2 million electron volts.

22. The method of claim 1 or claim 2, wherein;
a) said generating an X-ray irradiation volume is performed by an X-ray source; and
b) said X-ray source is pulsed.

23. The method of claim 1 or claim 2, wherein each of the at least a feedstock reactant and the at least one reactant consists of gas, liquid, solid as powder, plasma or combinations thereof.

24. The method of claim 1 or claim 2, wherein:
a) the reaction vessel is configured to operate in a batch processing mode; and
b) the reaction vessel has a reaction vessel inlet for receiving said at least a feedstock reactant and a reaction vessel outlet, arranged at a lower height than the reaction vessel inlet, for removing contents of the reaction vessel.

25. The method of claim 24, wherein:
a) each of the one or more X-ray shielded injector pipes has an injector pipe inlet end at the bottom of the reaction vessel; and
b) each of the one or more X-ray shielded injector pipes extends from said injector pipe inlet end and through the irradiation volume towards the reaction vessel inlet.

26. The method of claim 1 or claim 2, wherein each of a plurality of the one or more X-ray shielded injector pipes is symmetrically arranged around a longitudinal axis of the reaction vessel.

27. A system comprising a combination of a reaction vessel having an X-ray irradiation volume for receiving at least a feedstock reactant and an X-ray shielded injector pipe that extends into the X-ray irradiation volume for introducing at least one reactant, other than the at least one feedstock reactant, into the X-ray irradiation volume, wherein the X-ray shielded injector pipe has a main X-ray shielded path extending along a majority of a length of the X-ray irradiation volume and having a plurality of injector apertures; each injector aperture extending transversely outwardly from the main X-ray shielded path, being spaced along said main X-ray shielded path for a majority of the length of the X-ray irradiation volume, and opening into the X-ray irradiation volume to allow said at least one reactant to reach the X-ray irradiation volume.

28. The system of claim 27, wherein the X-ray shielded injector pipe, after through a side wall of the reaction vessel, is installed onto the reaction vessel using a continuous welding process and is then subsequently installed onto an inside wall of the reaction vessel using spot-welding.

29. The system of claim 27, wherein the X-ray shielded injector pipe is of a straight configuration.

30. The system of claim 27, wherein the X-ray shielded injector pipe is of spiral configuration.

31. The system of claim 27, wherein the main X-ray shielded path includes:
a) an inner pipe;
b) an outer pipe surrounding the inner pipe; and
c) an intermediate X-ray shield material contained in a volume between the inner pipe and the outer pipe; and
d) each of the injector apertures comprises a respective injector aperture insert sealingly connected between the inner and outer pipes.

32. The system of claim 31, wherein each respective injector aperture insert is sealed by including an outer male thread for mating with an outer female thread in an outer pipe threaded hole and an inner male thread for mating with an inner female thread in an inner pipe threaded hole.

33. The system of claim 32, wherein:
(a) the inner male thread is straight-walled for respectively mating with the inner female thread, which is tapered; and
(b) the outer male thread is tapered for respectively mating with the outer female thread, which is straight-walled.

34. The system of claim 31, wherein X-ray radiation shielding, for the at at least one reactant, arises from the intermediate shield material and any shielding provided by any of the inner and outer pipes.

35. The system of claim 31, wherein each of the inner and outer pipes includes a sealed end cap for isolating the intermediate X-ray shield material from the at least one reactant introduced into the X-ray shielded injector pipe.

* * * * *